(12) United States Patent
Okada et al.

(10) Patent No.: US 11,385,448 B2
(45) Date of Patent: Jul. 12, 2022

(54) MICROSCOPE APPARATUS

(71) Applicant: SYSMEX CORPORATION, Kobe (JP)

(72) Inventors: Masaya Okada, Kobe (JP); Shigeki Iwanaga, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 273 days.

(21) Appl. No.: 16/583,328

(22) Filed: Sep. 26, 2019

(65) Prior Publication Data

US 2020/0103347 A1  Apr. 2, 2020

(30) Foreign Application Priority Data

Sep. 28, 2018  (JP) .............................. JP2018-184825

(51) Int. Cl.
*G02B 21/00* (2006.01)
*G02B 21/26* (2006.01)
(Continued)

(52) U.S. Cl.
CPC ..... *G02B 21/0032* (2013.01); *G02B 21/0076* (2013.01); *G02B 21/12* (2013.01);
(Continued)

(58) Field of Classification Search
CPC ........................ G02B 21/0032; G02B 21/0076; G02B 21/12; G02B 21/16; G02B 21/26;
(Continued)

(56) References Cited

U.S. PATENT DOCUMENTS

2003/0107800 A1   6/2003  Doering et al.
2009/0161205 A1   6/2009  Harada et al.
(Continued)

FOREIGN PATENT DOCUMENTS

EP   1 950 595 A1   7/2008
EP   2 078 974 A2   7/2009
(Continued)

OTHER PUBLICATIONS

Extended European Search Report dated Jul. 27, 2020, in a counterpart European patent Application No. 19200083.4-1020. (13 pages).
(Continued)

*Primary Examiner* — Stephone B Allen
*Assistant Examiner* — Adam W Booher
(74) *Attorney, Agent, or Firm* — Buchanan, Ingersoll & Rooney PC

(57) ABSTRACT

A microscope apparatus includes: a sample setting unit in which a sample is set; an imaging unit configured to image the sample set in the sample setting unit; a housing unit on which the sample setting unit is arranged, and which is configured to internally accommodate the imaging unit; a first light source configured to irradiate light for fluorescence excitation on the sample in the sample setting unit; a first cover configured to be movable to a first position that covers the sample setting unit and a second position that opens the sample setting unit; and a second cover configured to be movable within the first cover; and a second light source arranged in a space covered with the second cover and configured to irradiate light on the sample in the sample setting unit.

13 Claims, 17 Drawing Sheets

(51) Int. Cl.
  *G02B 21/36* (2006.01)
  *G02B 21/16* (2006.01)
  *G02B 21/12* (2006.01)
  *G01N 21/64* (2006.01)

(52) U.S. Cl.
  CPC ............ *G02B 21/16* (2013.01); *G02B 21/26* (2013.01); *G02B 21/361* (2013.01); *G01N 21/6458* (2013.01); *G02B 21/368* (2013.01)

(58) Field of Classification Search
  CPC .... G02B 21/361; G02B 21/368; G02B 21/06; G02B 21/36; G02B 21/362; G02B 21/365; G02B 21/367; G01N 21/6458
  See application file for complete search history.

(56) References Cited

U.S. PATENT DOCUMENTS

| | | | |
|---|---|---|---|
| 2013/0027539 A1 | 1/2013 | Kiyota et al. | |
| 2015/0160260 A1* | 6/2015 | Gabi | G01Q 30/04 850/10 |
| 2015/0248002 A1* | 9/2015 | Ingersoll | G02B 21/26 359/395 |
| 2016/0363753 A1* | 12/2016 | Todd | G02B 21/02 |
| 2018/0074308 A1 | 3/2018 | Okada et al. | |
| 2018/0275061 A1* | 9/2018 | Sase | G01N 21/6458 |

FOREIGN PATENT DOCUMENTS

| | | |
|---|---|---|
| EP | 3 293 560 A1 | 3/2018 |
| JP | 2006162764 A | 6/2006 |
| JP | 2008-292583 A | 12/2008 |
| JP | 2018-44997 A | 3/2018 |
| WO | 02/29467 A2 | 4/2002 |

OTHER PUBLICATIONS

Partial European Search Report dated Feb. 28, 2020, in a counterpart European patent application No. 19200083.4. (14 pages).

Office Action dated Apr. 1, 2022, by the of China National Intellectual Property Administration in a counterpart Chinese Patent Application No. 201910920538.7, and an English translation of the Office Action (21 pages).

English translation of Notice of Reasons for Refusal dated May 31, 2022, by the Japanese Patent Office in corresponding Japanese Patent Application No. 2018-184825. (5 pages).

\* cited by examiner

FIG. 1A First position
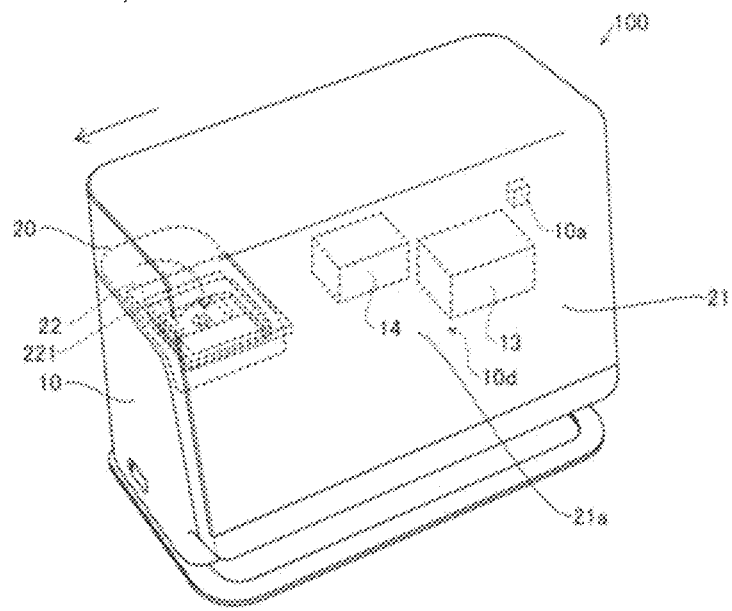
FIG. 1B Second position
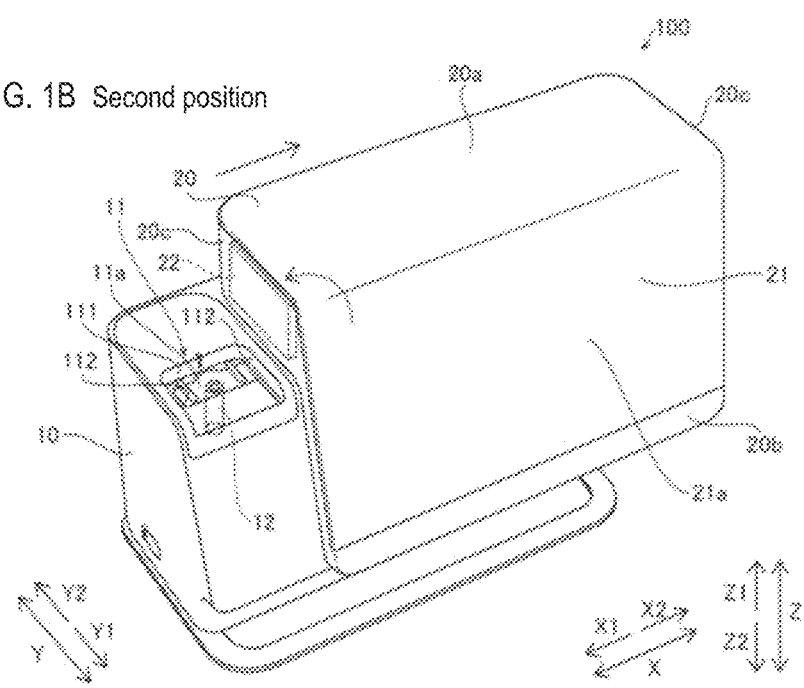

FIG. 19A First position
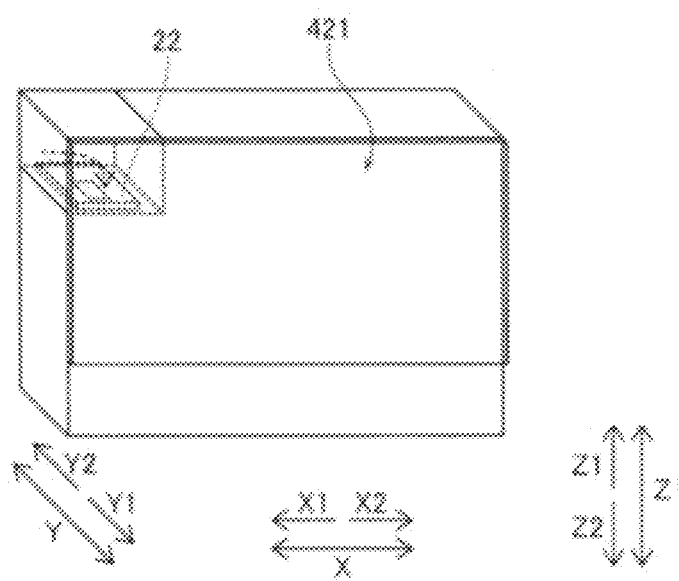
FIG. 19B Second position
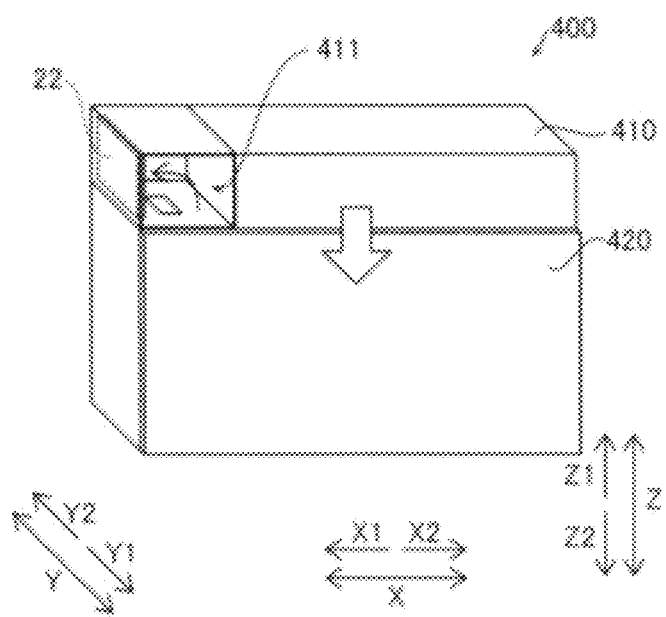

FIG. 20A First position
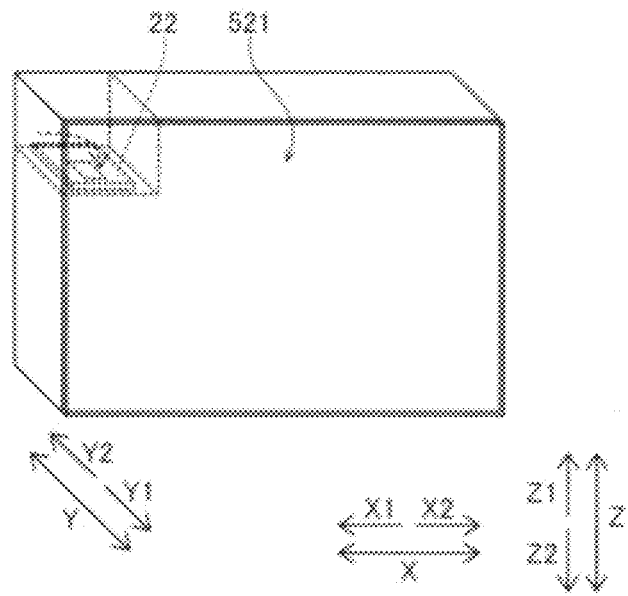
FIG. 20B Second position
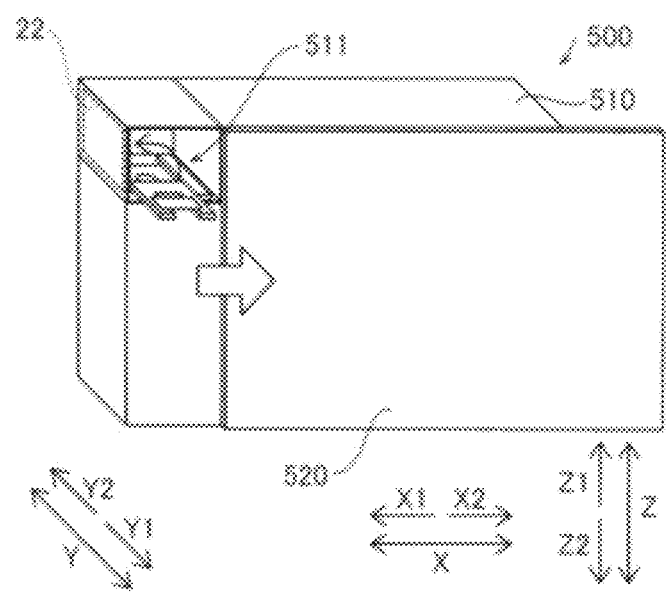

FIG. 21A First position
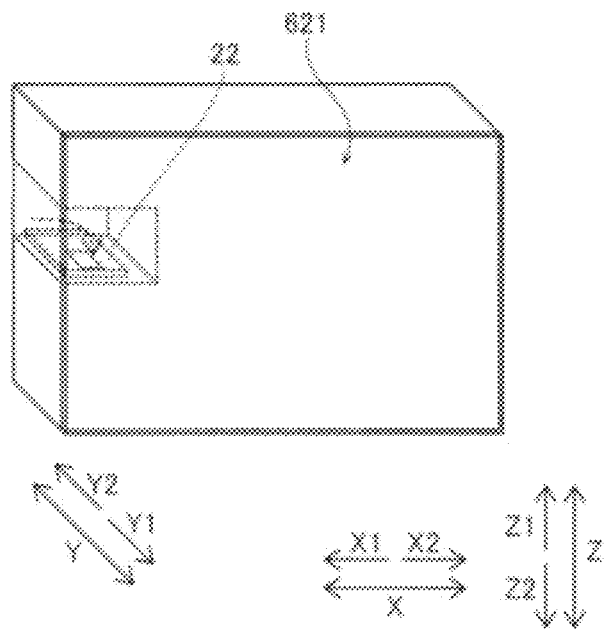
FIG. 21B Second position
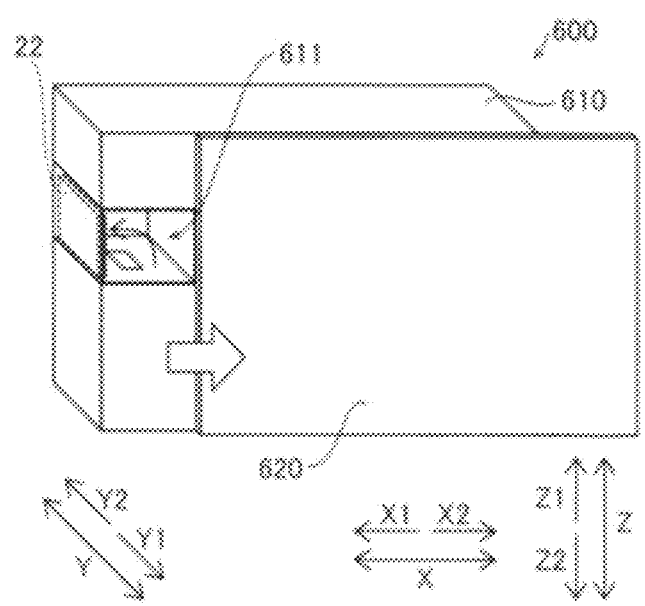

MICROSCOPE APPARATUS

CROSS REFERENCE TO RELATED APPLICATIONS

This application claims priority from prior Japanese Patent Application No. 2018-184825, filed on Sep. 28, 2018, entitled "MICROSCOPE APPARATUS", the entire contents of which are incorporated herein by reference.

FIELD OF THE INVENTION

The present invention relates to a microscope apparatus.

BACKGROUND

Japanese Patent Publication No. 2006-162764, as shown in FIG. 28, discloses a microscope apparatus 800 including a stage 801 for placing a sample, a camera 802 for imaging a sample placed on the stage 801, a light source 803 for irradiating transmission light for bright field observation toward the stage 801, and a light source 804 for irradiating light for fluorescence observation toward a stage 801. In the microscope apparatus 800, the front of the stage 801 is covered with a removable sample cover 805, and the upper portion of the stage 801 is covered with an openable/closable lid 806, so that external light is prevented from entering the stage 801 during imaging by fluorescence observation.

In the microscope apparatus of Japanese Patent Publication No. 2006-162764, the light source 803 emits light from above the stage 801, and the light source 804 emits light from below the stage 801. The optical axis of light from above irradiated from the light source 803 coincides with the optical axis of an objective lens 807 installed on the stage 801.

SUMMARY OF THE INVENTION

In the microscope apparatus 800 of Japanese Patent Publication No. 2006-162764, external light may enter from a slight gap when the sample cover 805 and the lid 806 are not sufficiently adhered. Therefore, a problem arises inasmuch as it is difficult to accurately capture light when detecting and capturing a weak light. In addition, heat generated from the camera 802 or the like inside the sample cover 805 and the lid 806 is transmitted to the stage 801 and affects the sample.

Furthermore, in the microscope apparatus, it is desired to efficiently adjust the position of the sample for imaging the sample. It is also desired to prevent the contrast of an image of the sample from being weakened and to clearly capture the image of the sample when light is irradiated from above.

A microscope apparatus 100 according to a first aspect of the present invention is provided with a sample setting unit 11 for setting a sample, an imaging unit 10d for imaging a sample set on the sample setting unit 11, a housing unit 10 in which the imaging unit 10d is disposed and which accommodates the sample setting unit 11, a first light source 13 that irradiates the sample setting unit 11 with light for fluorescence excitation, a first cover 20 that is movable to a first position that covers the sample setting unit 11 and a second position that exposes the sample setting unit 11, a second cover 22 that is movable to a closed state that covers the sample setting unit 11 in the first cover 20 and an open state that exposes the sample setting unit 11, and a second light source 221 that is disposed in a space covered by the second cover 22 and that irradiates light on the sample setting unit 11.

In the microscope apparatus 100 according to the first aspect of the present invention described above is provided with the first cover 20 that is movable to the first position that covers the sample setting unit 11, and the second cover 22 that is movable to the closed state that covers the sample setting unit 11 in the first cover 20. In this way, since the sample setting unit 11 can be covered twice by the first cover 20 and the second cover 22, even if a slight gap is generated between the first cover 20 and the housing unit, the arrival of external light to the sample setting unit 11 can be reliably suppressed by the second cover 22. As a result, it is possible to reliably suppress entry of light from the outside into the sample setting unit 11 and accurately capture weak light. Note that covering the sample setting unit 11 with the first cover 20 also includes the situation where the sample setting unit 11 is covered with the first cover 20 after covering the sample setting unit 11 with the second cover 22, in addition to directly covering the sample setting unit 11 with the first cover 20. Since the sample setting unit 11 can be covered by the second cover 22, it also is possible to suppress the heat generated from the imaging unit 10d and the like disposed inside the housing unit 10 from being transmitted to the sample setting unit 11. In this way the influence on the sample by heat can be reduced. By providing the second light source 221 that irradiates the sample setting unit 11 with light in a state in which the second cover 22 is closed, imaging can be performed with the first cover 20 and the second cover 22 closed, since the second light source 221 can irradiate the sample setting unit 11 in a closed state in which the external light does not reach the sample setting unit 11. In this way, it is possible to perform imaging with fluorescence without performing the operation of closing the first cover 20 and the second cover 22 after adjusting the position of the sample for imaging the sample with light irradiated from the second light source 221. As a result, it is possible to suppress the sample from being displaced due to vibrations when closing the first cover 20 and the second cover 22, and it is possible to suppress an increase in imaging time.

In the microscope apparatus 100 according to the first aspect, the second light source 221 is preferably provided on the second cover 22. If configured in this way, light can be easily irradiated on the sample setting part 11 from the second light source 221 in the state in which the second cover 22 is closed. Further, it is not necessary to provide a light guide member such as an optical fiber, so that the configuration of illumination can be simplified by arranging the second light source 221 directly on the second cover 22.

In this case, the second light source 221 preferably has a planar shape, a linear shape, or a punctate shape. If comprised in this way, the second light source 221 can be compactly arranged on the second cover 22 since the second light source 221 of thin planar shape, linear shape, or punctate shape can be arranged on the second cover 22. In the case of surface emission, the amount of light also can be easily increased, so that clear imaging can be performed. In the case of linear light emission or punctate light emission, it is only necessary to arrange a needed amount of light emitters, so that the apparatus configuration can be simplified.

In the configuration in which the second light source 221 is provided on the side of the second cover 22 facing the sample setting unit 11, the second cover 22 preferably surrounds the second light source 221 in a frame shape, and the sample setting unit 11 includes a recess 113 which accommodates the projection 222 when the second cover 22 is in a closed state. If configured in this way, the protrusion part 222 of the second cover 22 will enter into the concavity 113 of the sample setting unit 11, such that the gap through which light enters directly between the second cover 22 and the sample setting unit 11 is suppressed and it is possible to more effectively suppress light from entering the sample setting unit 11.

The microscope apparatus 100 according to the first aspect is preferably configured so that the second cover 22 is in a closed state that covers the sample setting unit 11 when the first cover 20 is located at the first position, and the second cover 22 is in an open state in which the sample setting unit 11 is exposed when the first cover 20 is located at the second position. If configured in this way, the sample setting unit 11 can be covered twice by the first cover 20 and the second cover 22 by having the first cover 20 located at the first position (position which covers the sample setting unit 11) and the second cover 22 located in a closed state. The sample setting unit 11 also can be easily accessed by placing the first cover 20 in the second position (open position) and opening the second cover 22.

In this case, preferably, the second cover 22 is configured to be closed after the first cover 20 moves relative to the first position with regard to the housing unit 10, and to be open before the first cover 20 moves relative to the second position with regard to the housing unit 10. If configured in this way, since the first cover 20 does not relatively move when the second cover 22 is in the closed state, the closed second cover 22 does not interfere with the relative movement of the first cover 20.

The microscope apparatus 100 according to the first aspect is preferably provided with a controller 192 for controlling the first drive unit 10a that moves the first cover 20 relative to the housing unit 10, and the second drive unit 223 that drives the second cover 22 to open and close. If configured in this way, since the first cover 20 and the second cover 22 can be moved in concert by the controller 192, the work burden of the user can be reduced compared with when the first cover 20 and the second cover 22 are moved manually.

In this case, the controller 192 is preferably configured to control the light irradiation of the first light source 13 and the light irradiation of the second light source 221. If configured in this way, the light of the first light source 13 for fluorescence and the light of the second light source 221 can be switched by the controller 192, and the sample setting unit 11 can be irradiated.

In the microscope apparatus 100 according to the first aspect, the second light source 221 preferably includes at least one of a halogen lamp, a tungsten lamp, a mercury lamp, a xenon lamp, and a light emitting element. If configured in this way, light can be irradiated on the sample setting unit 11 with a halogen lamp, a tungsten lamp, a mercury lamp, a xenon lamp, or a light emitting element.

In the microscope apparatus 100 according to the first aspect, the second light source 221 is configured to irradiate the sample with light from a direction oblique to the optical axis of the objective lens 12 provided in the sample setting unit 11. If configured in this way, the sample can be imaged with augmented contrast compared with when light is irradiated in parallel with the optical axis of the objective lens 12.

In the microscope apparatus 100 according to the first aspect, the second light source 221 is preferably configured to emit light for bright field. If configured in this way, the light for bright field is irradiated on the sample setting unit 11 by the second light source 221, and bright field imaging is performed in the state in which the first cover 20 and the second cover 22 are closed.

In the microscope apparatus 100 according to the first aspect, preferably, a plurality of fluorescent images are captured by the imaging unit 10d using the fluorescence light of the first light source 13, and a super-resolution image which exceeds the resolution of the imaging unit 10d is acquired based on the plurality of fluorescent images. If configured in this way, since the fluorescent image can be imaged by the imaging unit 10d in the state which external light is reliably prevented from entering the sample setting unit 1, a super-resolution image can be imaged even with weak light.

A microscope apparatus 100 according to a second aspect of the present invention is provided with a sample setting unit 11 for setting a sample, an imaging unit 10d for imaging a sample set on the sample setting unit 11, a housing unit 10 within which the imaging unit 10d is disposed and provided with the sample setting unit 11, a first light source 13 for irradiating the sample setting unit 11 with light for fluorescence, a first cover 20 which is movable between a first position covering the sample setting unit 11 and a second position exposing the sample setting unit 11, and a second cover 22 that covers the sample setting unit 11 so as to insulate the sample setting unit 11 within the first cover 20.

In the microscope apparatus 100 according to the second aspect of the present invention described above, the first cover 20 is movable to a first position covering the sample setting unit 11, and the second cover 22 is movable to close and cover the sample setting unit 11 within the first cover 20. In this way, since the sample setting unit 11 can be covered twice by the first cover 20 and the second cover 22, even if a slight gap is generated between the first cover 20 and the housing, the arrival of external light to the sample setting unit 11 can be reliably suppressed by the second cover 22. As a result, it is possible to reliably suppress entry of light from the outside into the sample setting unit 11 and accurately capture weak light. Note that covering the sample setting unit 11 with the first cover 20 also includes the situation where the sample setting unit 11 is covered with the first cover 20 after covering the sample setting unit 11 with the second cover 22, in addition to directly covering the sample setting unit 11 with the first cover 20. Since the sample setting unit 11 can be covered by the second cover 22 so as to be thermally insulated, heat generated from the imaging unit 10d or the like disposed inside the housing unit 10 is prevented from being transmitted to the sample setting unit 11. In this way the influence on the sample by heat can be reduced.

A microscope apparatus 100 according to a third aspect of the present invention includes a sample setting unit 11 for setting a sample, an imaging unit 10d for imaging a sample set on the sample setting unit 11, a first light source 20 that irradiates light from below on the sample setting unit 11, a second light source 221 irradiates light from above on the sample setting unit 11, wherein the second light source 221 is configured to irradiate light on the sample from an oblique direction with respect to an optical axis of an objective lens provided in the sample setting unit 11.

In the microscope apparatus 100 according to the third aspect of the present invention described above, the second light source 221 is configured to irradiate the sample with light from a direction oblique to the optical axis of the objective lens 12 provided in the sample setting unit 11. In this way the sample can be imaged with enhanced contrast compared with when light is irradiated in parallel with the optical axis of the objective lens 12. As a result, a clear image can be obtained when imaged by light from above.

In the microscope apparatus 100 according to the third aspect, the second light source 221 is preferably arranged such that the optical axis is inclined with respect to the optical axis of the first light source 13. If configured in this way, the optical axis direction of the second light source 221 can be inclined easily.

In the microscope apparatus 100 according to the third aspect, the microscope apparatus 100 preferably includes a cover 22 that covers the sample setting unit 11, and the second illumination 221 is provided on the cover 22. If configured in this way, light can be easily irradiated on the sample setting unit 11 from the second light source 221 when the cover 22 is closed. By arranging the second light source 221 directly on the cover 22, it is unnecessary to provide a light guide member such as an optical fiber, so that the configuration of light source can be simplified.

In this case, the second light source 221 is preferably provided on the cover 22 so as to be inclined. According to this configuration, the optical axis direction of the second light source 221 can be easily inclined with respect to the optical axis direction of the objective lens 12.

In the microscope apparatus 100 according to the third aspect, the second light source 221 is preferably formed so as not to irradiate light from a portion through which the optical axis of the first light source 13 passes. According to this configuration, the optical axis of the light of the second light source 221 can be easily shifted with respect to the optical axis of the objective lens 12.

In the microscope apparatus 100 according to the third aspect, the first light source 13 preferably emits light for fluorescence excitation, and the second light source 221 preferably emits bright field light. If configured in this way, a bright field image can be captured clearly since the optical axis of the bright field light can be inclined.

In the microscope apparatus 100 according to the third aspect, the second light source 221 preferably has a planar shape, a linear shape, or a punctate shape. If configured in this way, the second light source 221 can be arrange compactly since a second light source 221 of thin planar shape, a linear shape, or a punctate shape can be used. In the case of surface emission, the amount of light also can be easily increased, so that clear imaging can be performed. In the case of linear light emission or punctate light emission, it is only necessary to arrange a needed amount of light emitters, so that the apparatus configuration can be simplified.

In the microscope apparatus 100 according to the third aspect, the second light source 221 preferably includes at least one of a halogen lamp, a tungsten lamp, a mercury lamp, a xenon lamp, and a light emitting element. If configured in this way, light can be irradiated on the sample setting unit 11 with a halogen lamp, a tungsten lamp, a mercury lamp, a xenon lamp, or a light emitting element.

It is possible to reliably suppress the entry of external light into the sample setting unit, accurately capture weak light, and suppress the influence of heat on the sample. A clear image also can be captured when imaging is performed by light from above.

BRIEF DESCRIPTION OF THE DRAWINGS

FIGS. 1A and 1B are perspective views showing an example of a microscope apparatus;

FIGS. 19A and 19B are schematic perspective views showing a configuration of a first modification of the microscope apparatus;

FIGS. 20A and 20B are schematic perspective views showing a configuration of a second modification of the microscope apparatus;

FIGS. 21A and 21B are schematic perspective views showing the configuration of a third modification of the microscope apparatus;

DESCRIPTION OF THE EMBODIMENTS

Figure 2:
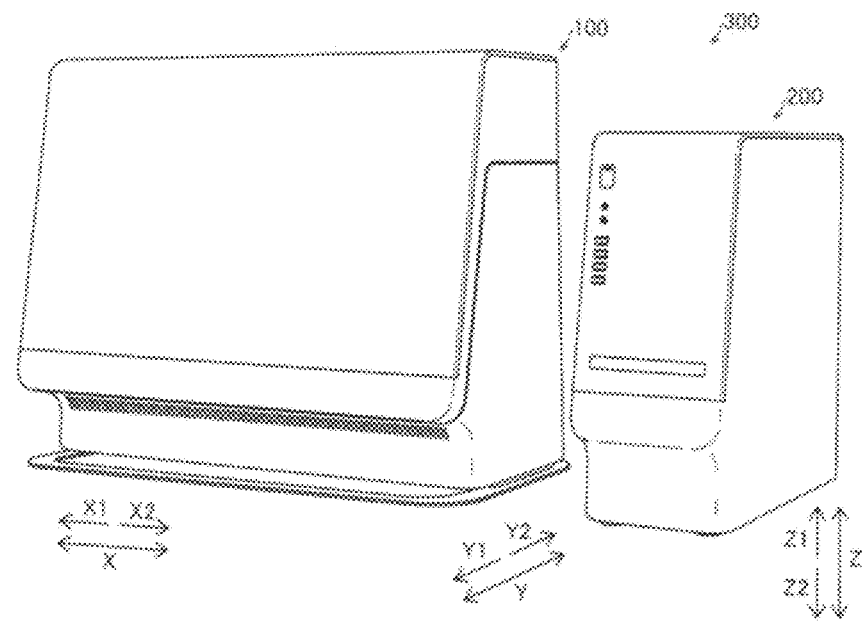
FIG. 2 is a perspective view showing an example of a microscope system.

Hereinafter, embodiments will be described with reference to the drawings.

General Structure of Microscope Apparatus

An overview of the microscope apparatus 100 according to the present embodiment will be described with reference to FIGS. 1A and 1B.

The microscope apparatus 100 is an apparatus for enlarging and displaying a sample placed on the sample setting unit 11. The sample is a biological sample, such as cells, collected from a subject (specimen donor).

As shown in FIG. 1A, the microscope apparatus 100 includes a housing unit 10 and a first cover 20. The microscope apparatus 100 includes an imaging unit 10d and a sample setting unit 11. The imaging unit 10d includes an objective lens 12, a first light source 13, and an imaging element 14. The sample setting unit 11 is provided on the upper surface (the surface on the Z1 direction side) of the housing unit 10. The objective lens 12, the first light source 13, and the imaging element 14 are provided inside the housing unit 10. The microscope apparatus 100 includes a display unit 21. The display unit 21 is provided on the front surface (the surface on the Y1 direction side) of the first cover 20. The display surface 21a of the display unit 21 is disposed on the front side of the first cover 20. The microscope apparatus 100 includes a first drive unit 10 that moves the first cover 20 relative to the housing unit 10. The microscope apparatus 100 includes a second cover 22. The second cover 22 is disposed in the inside of the first cover 20. The second cover 22 is provided with a second light source 221.

Hereinafter, two directions orthogonal to each other in a plane parallel to the installation surface of the microscope apparatus 100 (that is, a horizontal plane) are defined as an X direction and a Y direction, respectively. As shown in FIG. 1B, the microscope apparatus 100 has a substantially rectangular outer shape that extends along the X direction and the Y direction in plan view. The X direction is the left-right direction of the microscope apparatus 100, and the Y direction is the front-rear direction of the microscope apparatus 100. The Y1 direction is the front direction of the apparatus main body, and the Y2 direction is the rear direction of the apparatus main body. The vertical direction perpendicular to the horizontal plane is designated the Z direction. The Z1 direction is the upward direction, and the Z2 direction is the downward direction.

The first cover 20 is relatively movable together with the display unit 21 with respect to the housing unit 10 to a first position (see FIG. 1A) at which the sample setting unit 11 is covered by the first cover 20, and a second position (see FIG. 1B) at which the cover 20 is open and the sample setting unit 11 is exposed. Specifically, the first cover 20 is relatively movable to the first position (light shielded position) and the second position (open position) by sliding relative to the housing unit 10 in a direction substantially parallel to the installation surface of the housing unit 10. The sample is set on the sample setting unit 11 in a state where the first cover 20 is relatively moved to the second position with respect to the housing unit 10. The sample in the sample setting unit 11 is imaged with the first cover 20 relatively moved to the first position with respect to the housing unit 10.

The imaging unit 10d images the sample placed in the sample setting unit 11. Specifically, the imaging unit 10d collects light from the sample via the objective lens 12 and images the sample with the imaging element 14. Light from the first light source 13 irradiates the sample and the imaging unit 10d captures an image by fluorescence. For example, the imaging unit 10d irradiates laser light from the first light source 13 to excite the sample, and images the fluorescence given off from the sample. That is, the imaging unit 10d captures a fluorescent image. Light from the second light source 221 irradiates the sample and the imaging unit 10d captures a bright field image. That is, when the first cover 20 and the second cover 22 are closed, it is possible to capture an image by irradiating light from the second light source 221 and to narrowly restrict an imaging region for performing fluorescence observation from the captured image. When the imaging region is narrowly restricted, it is possible to stop the irradiation of the light of the second light source 221 and continue to perform imaging by fluorescence observation since the first cover 20 and the second cover 22 are closed.

The sample setting unit 11 is provided in the housing unit 10. The housing unit 10 includes an internal imaging unit 10d.

The first light source 13 irradiates the sample setting unit 11 with light for fluorescence excitation. For example, the first light source 13 irradiates the sample setting unit 11 with a laser beam of a specific wavelength. That is, the first light source 13 irradiates light for fluorescence excitation that excites the sample.

The second cover 22 is provided separately from the first cover 20. The second cover 22 covers the sample setting unit 11 within the first cover 20. The second cover 22 also is movable in the first cover 20 between a closed state that covers the sample setting unit 11 and an open state that exposes the sample setting unit 11. The second cover 22 covers the sample setting unit 11 within the first cover 20 so as to insulate the sample setting unit 11. That is, it is preferable that the second cover 22 is formed with a material which has thermal insulation properties. For example, the second cover may be formed of a heat insulating material such as an ABS resin or a PCABS resin, a metal provided with a heat insulating material, or the like.

The second light source 221 is provided separately from the first light source 13. The second light source 221 can irradiate the sample setting unit 11 with light when the second cover 22 is closed. That is, the second light source 221 is disposed in the space covered by the second cover 22 and can irradiate the sample setting unit 11 with light. The second light source 221 emits light when performing bright field imaging. The second light source 221 does not irradiate light when performing fluorescence imaging.

As described above, the first cover 20 is provided so as to move to the first position that covers the sample setting unit 11, and the second cover 22 is provided so as to cover the sample setting unit 11 in the first cover 20. In this way, since the sample setting unit 11 can be covered twice by the first cover 20 and the second cover 22, even if a slight gap is generated between the first cover 20 and the housing, the arrival of external light to the sample setting unit 11 can be reliably suppressed by the second cover 22. As a result, it is possible to reliably suppress entry of light from the outside into the sample setting unit 11 and accurately capture weak light. Since the sample setting unit 11 can be covered by the second cover 22, it also is possible to suppress the heat generated from the imaging unit 10d and the like disposed inside the housing unit 10 from being transmitted to the sample setting unit 11. In this way the influence on the sample by heat can be reduced. By providing the second light source 221 that irradiates the sample setting unit 11 with light in a state in which the second cover 22 is closed, imaging can be performed with the first cover 20 and the second cover 22 closed, since the second light source 221 can irradiate the sample setting unit 11 in a closed state in which the external light does not reach the sample setting unit 11. In this way, it is possible to perform imaging with fluorescence without performing the operation of closing the first cover 20 and the second cover 22 after adjusting the position of the sample for imaging the sample with light irradiated from the second light source 221. As a result, it is possible to suppress the sample from being displaced due to vibrations when closing the first cover 20 and the second cover 22, and it is possible to suppress an increase in imaging time.

As shown in FIGS. 1A and 1B, the first cover 20 is substantially parallel to the installation surface of the housing unit 10 and is relatively slidable with regard to the housing unit 10 in the longitudinal direction (X direction) of the housing unit 10. Specifically, the first cover 20 is moved with respect to the hosing 10 and the installation surface in a state wherein the housing unit 10 does not move with respect to the installation surface. The first cover 20 is configured to be movable relative to the housing unit 10 in a direction substantially parallel to the display surface 21a of the display unit 21. In other words, the first cover 20 can be moved relative to the housing unit 10 in a direction (X direction) that is substantially perpendicular to a side surface (side surfaces in the X1 direction and the X2 direction) intersecting the front surface of the housing unit 10. The first cover 20 also can be moved relative to the sample setting unit 11 in the horizontal direction. In this way enlargement of the microscope apparatus 100 in the vertical direction can be avoided compared with when the first cover 20 is moved orthogonally to the vertical direction with respect to the sample setting unit 11.

The first cover 20 is moved relative to the housing unit 10 by the first drive unit 10a via external control. For example, the first cover 20 is relatively moved to the first position (light-shielding position) and the second position (open position) by driving the first drive unit 10a based on a user operation or a program. The first drive unit 10a includes, for example, a motor and a belt-pulley mechanism.

As shown in FIG. 1B, a sample is placed in the sample setting unit 11. The sample setting unit 11 is disposed on the upper surface (surface in the Z1 direction) of the housing unit 10, which is substantially parallel to the installation surface of the housing unit 10. In this way, when the first cover 20 is relatively moved to the second position (open position), the upper part of the sample setting unit 11 can be opened, so that the sample setting part 11 can be easily accessed.

The sample setting unit 11 is provided in the housing unit 10 at a position lower than the horizontal surface 20a of the first cover 20. In this way the upper part of the sample setting unit 11 can be opened, and the user can easily perform the sample setting operation on the sample setting unit 11 from above the sample setting unit 11.

The sample setting unit 11 is provided in a concave shape on the upper surface of the housing unit 10 so that a portion, except for one side in the horizontal direction and the upper side, is circumscribed by a wall. For example, the sample setting unit 11 is provided in a concave shape on the upper surface of the housing unit 10 so that portions other than the front side and the upper side of the housing unit 10 are surrounded by a wall. Specifically, the sample setting unit 11 includes a wall part 111 provided in the Y2 direction and a wall part 112 arranged so as to face the X direction. The sample setting unit 11 is surrounded by the wall part 111 and a pair of wall parts 112 on the X1 direction side, the X2 direction side, and the Y2 direction side. When the first cover 20 is located at the second position (open position), the sample setting unit 11 is open on the upper side and in one horizontal direction. For example, when the first cover 20 is located at the second position, the sample setting unit 11 is open upward (Z1 direction) and forward (Y1 direction).

The sample setting unit 11 is disposed near the end of the housing unit 10 in the direction in which the first cover 20 moves relative to the housing unit 10. The sample setting unit 11 is disposed on the upper surface near the end in the X direction of the housing unit 10. As shown in FIG. 1B, the sample setting unit 11 is disposed in the vicinity of the end of the housing unit 10 on the X1 direction side. In this way, enlargement of the microscope apparatus 100 can be avoided when the first cover 20 moves to the second position since the first cover 20 is moved to the second position (open position) by moving the first cover 20 relative to the casing 10 by a length corresponding to the width of the sample setting unit 11.

The sample setting unit 11 includes a stage 11a. The stage 11a is movable in the horizontal direction (X direction and Y direction) and in the vertical direction (Z direction). The stage 11a can move independently in the X direction, the Y direction, and the Z direction. In this way it is possible to enlarge and view a desired position of the sample since the sample can be moved relative to the objective lens 12.

As shown in FIG. 1B, the objective lens 12 is disposed in the vicinity of the stage 11a of the sample setting unit 11. The objective lens 12 is arranged close to the lower side (Z2 direction) of the stage 11a of the sample setting unit 11. The objective lens 12 is provided so as to face the sample setting unit 11 in the vertical direction (Z direction). The objective lens 12 is arranged so that the optical axis is substantially perpendicular to the sample setting surface on which the sample is place on the sample setting unit 11. The objective lens 12 is arranged facing upward. The objective lens 12 can be moved relative to the sample setting unit 11 in the vertical direction (Z direction). The objective lens 12 is disposed so as to have a longitudinal direction in the vertical direction. That is, the objective lens 12 is disposed so as to have an optical axis in a substantially vertical direction. The objective lens 12 includes a plurality of lenses. The objective lens 12 can enlarge the sample at a predetermined magnification. The objective lens 12 includes an immersion lens. That is, the objective lens 12 is used by dripping of oil such as silicone oil or liquid such as glycerin or water. Note that the objective lens 12 need not be an immersion lens. The objective lens 12 also may be used without dripping liquid.

As shown in FIGS. 1A and 1B, the first light source 13 can irradiate light on the sample. The first light source 13 irradiates light on the sample through the objective lens 12. The first light source 13 irradiates light on the sample from the same side as the imaging element 14. The first light source 13 can output light having a predetermined wavelength. The first light source 13 can output light having a plurality of different wavelengths. That is, the first light source 13 can output different types of light. The first light source 13 includes a light emitting element. The light emitting element includes, for example, an LED element or a laser element.

As shown in FIG. 1A, the imaging element 14 can image a sample based on the light emitted from the first light source 13. Specifically, the imaging element 14 can capture a still image or a moving image of the sample based on light from the sample irradiated by light emitted from the first light source 13. The imaging element includes, for example, a CCD element and a CMOS element. The imaging element 14 can perform high-sensitivity imaging. That is, the imaging element 14 can capture an image based on weak light. The imaging element 14 images the sample based on the light of the second light source 221 provided on the side opposite to the objective lens 12 (Z1 direction side) with respect to the sample setting unit 11.

As shown in FIG. 1B, the display unit 21 can display an image captured by the imaging element 14. The display unit 21 is provided integrally with the first cover 20. The display unit 21 can display a screen for operating the microscope apparatus 100. The display unit 21 can display a screen based on a program for imaging a sample. The display unit 21 can display a screen indicating the state of the microscope apparatus 100. The display unit 21 can display a screen based on a signal from an external control unit. The display unit 21 is disposed on one side of the first cover 20 in the horizontal direction. For example, the display unit 21 is disposed on the front side (Y1 direction side) of the first cover 20.

As shown in FIG. 1B, the first cover 20 includes a horizontal surface 20a, an intersecting surface 20b, and a pair of side surfaces 20c arranged to face each other in the X direction. The horizontal surface 20a is configured to extend in a direction (XY direction) substantially parallel to the installation surface of the housing unit 10 so as to cover the sample installation unit 11 of the housing unit 10 from above. The intersecting surface 20b is connected to the horizontal surface 20a, extends in a direction intersecting the horizontal surface 20a, and is configured to cover the sample setting unit 11 of the housing unit 10 from one side substantially parallel to the setting surface. Specifically, the intersecting surface 20b is configured to cover the sample setting unit 11 of the housing unit 10 from the front. In this way, when the first cover 20 is relatively moved to the second position (open position), the upper side and the front side of the sample setting unit 11 can be opened, so that the sample setting unit 11 can be easily accessed. As a result, work on the sample setting unit 11 can be performed more easily. The visibility of the display unit 21 can be improved by positioning the display part 21 at the intersecting surface 20b since the display unit 21 can be arranged at the front surface. The side surface 20c is connected to the lower side of both ends in the X direction of the horizontal surface 20a. The side surface 20c is formed so as to extend in the vertical direction. The side surface 20c is configured to cover the sample setting unit 11 of the housing unit 10 from the X direction side. The first cover 20 is formed in a substantially inverted L shape by the horizontal surface 20a and the intersecting surface 20b. The display unit 21 is disposed on the intersecting surface 20b.

As shown in FIG. 1A, the first cover 20 is configured to substantially cover the entire housing unit 10 when the first cover 20 is located at the first position (light-shielding position), since the first cover 20 is substantially parallel to the installation surface of the housing unit 10, that is, by the display unit 21 arranged on the intersecting surface 20b of the first cover 20 in the longitudinal direction of the housing unit 10. The display unit 21 is disposed on substantially the entire intersecting surface 20b. The intersecting surface 20b is configured to cover the entire surface on one side in the horizontal direction of the housing unit 10 when the first cover 20 is located at the first position. The display unit 21 is disposed across substantially the entire intersecting surface 20b of the first cover 20 in the horizontal direction (X direction) of the screen. The display unit 21 is disposed across substantially the entire intersecting surface 20b of the first cover 20 in the vertical direction of the screen (the direction along the Z direction). In this way, since the display part 21 can be positioned in the range which covers substantially the entire longitudinal direction (X direction) of the front surface of the housing unit 10, the display part 21 can be enlarged. As a result, it is possible to make the display contents easy to see.

The display unit 21 is arranged to have a predetermined inclination relative to a direction (Z direction) perpendicular to the installation surface of the housing unit 10. In other words, the intersecting surface 20b of the first cover 20 is disposed so as to have a predetermined inclination relative to a direction (Z direction) perpendicular to the installation surface. For example, the display unit 21 is arranged in a state of being inclined by approximately 1 degree to 30 degrees relative to a direction perpendicular to the installation surface. The display unit 21 is arranged such that the lower end (Z2 direction end) protrudes forward (Y1 direction) relative to the upper end (Z1 direction end). In this way the display part 21 can be made easier to see compared with when the display unit 21 is positioned along the direction perpendicular to the installation surface. The portion of the first cover 20 where the display unit 21 is disposed has substantially the same inclination as the predetermined inclination.

The display unit 21 is disposed on the first cover 20 so as to have a predetermined inclination relative to the vertical direction, and to move relative to the sample setting unit 11 with the display unit 21 arranged at the predetermined inclination. In this way the display unit 21 can be relatively moved in a state having a predetermined inclination, so that the display unit 21 can be easily seen at any position.

The front surface (surface in the Y1 direction) of the housing unit 10 has substantially the same inclination as the predetermined inclination of the intersecting surface 20b. The surface of the housing unit 10 facing the portion of the first cover 20 having substantially the same inclination as the predetermined inclination has substantially the same inclination as the predetermined inclination. The front surface of the housing unit 10 and the display unit 21 are substantially parallel.

The second cover 22 is closed to cover the sample setting unit 11 when the first cover 20 is located at the first position (light-shielding position), and the second cover 22 is open to expose the sample setting unit 11 when the first cover 20 is located at the second position (open position). In this way the sample cover 11 can be covered twice by the first cover 20 and the second cover 22 by placing the first cover 20 in the first position and closing the second cover 22. The sample setting unit 11 also can be easily accessed by placing the first cover 20 in the second position and opening the second cover 22.

Specifically, the second cover 22 is closed after the first cover 20 moves relative to the housing unit 10 to the first position (light shielding position), and the second cover 22 is open before the first cover 20 is moved to the second position (open position) relative to the housing unit 10. That is, when the second cover 22 is in the open state, the first cover 20 moves relative to the housing unit 10. In this way, when the second cover 22 is in the closed state, the first cover 20 is not relatively moved, so that the second cover 22 in the closed state is prevented from interfering with the relative movement of the first cover 20.

The second cover 22 is attached to the inside of the side surface 20c on one side (X1 direction side) of the first cover 20. The second cover 22 is rotatable around a rotational axis line extending in the Y direction. The second cover 22 enters the closed state which covers the sample setting unit 11 by rotating in a downward direction. The second cover 22 enters the open state in which the sample setting unit 11 is exposed by rotating in an upward direction. The second cover 22 may be switched between an open state and a closed state by sliding and moving in a horizontal direction. The second cover 22 also may be switched between an open state and a closed state by translational movement in a vertical direction.

The second cover 22 is driven relative to the first cover 20 by the second drive unit 223 under external control. For example, the second cover 22 is moved based on a user operation or a program such that the second drive unit 223 is driven to switch between a closed state and an open state. The second drive unit 223 includes, for example, a motor and a belt-pulley mechanism. The second cover 22 is driven by the second drive unit 223 in cooperation with opening and closing of the first cover 20.

As described above, the sample setting unit 11 can be shielded from light during imaging by providing the first cover 20 which is movable relative to the housing unit 10 to the first position at which the sample setting unit 11 is shielded from external light (light-shielding position) and the second position at which the sample setting unit 11 is exposed (open position) relative to the housing unit 10. In this way the microscope apparatus 100 can be installed and used in a bright location such as an examination room or a pathology classroom without installing the microscope apparatus 100 in a dark room. When the first cover 20 integrally provided with the display unit 21 is moved relative to the first position and the second position, the first cover 20 moves together with the display unit 21 so as to avoid blocking access to the sample setting unit when the first cover 20 is moved to the second position. In this way operations such as arranging a sample on the sample setting unit 11 can be easily performed. When the first cover 20 is moved to the second position, the display unit 21 does not get in the way when accessing the sample setting unit 11, and the display unit 21 therefore can be maximally enlarged. In this way the enlarged and displayed sample can be confirmed in detail.

Structural Example of Microscope System

Next, a specific structural example of the microscope system 300 will be described with reference to FIG. 2.

As shown in FIG. 2, the microscope system 300 includes a microscope apparatus 100 and a control unit 200. The microscope apparatus 100 and the control unit 200 are connected to each other so that signals can be transmitted and received. For example, the microscope apparatus 100 and the control unit 200 are connected to be communicable with each other by wire or wirelessly.

The control unit 200 is configured to control the microscope apparatus 100. The control unit 200 is configured by a computer, for example, and includes a CPU (Central Processing Unit), a memory, and the like. The control unit 200 controls the sample imaging process performed by the microscope apparatus 100. The control unit 200 controls the movement of the first cover 20 of the microscope apparatus 100 between the first position (light shielding position) and the second position (open position). The control unit 200 controls the movement of the second cover 22 of the microscope apparatus 100 between the closed state and the open state. The control unit 200 controls the microscope apparatus 100 based on a program. The control unit 200 can perform image processing on an image captured by the microscope apparatus 100. The control unit 200 can output the processed image to the microscope apparatus 100 and display it on the display unit 21 of the microscope apparatus 100. The control unit 200 can display an image based on the program on the display unit 21 of the microscope apparatus 100.

Next, a specific structural example of the second cover 22 of the microscope apparatus 100 will be described with reference to FIGS. 3 and 4.

Figure 3:
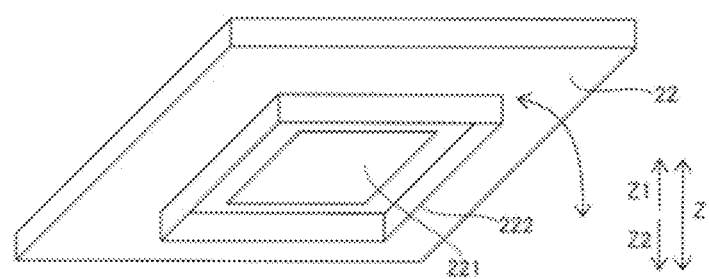
FIG. 3 is a perspective view showing an example of a second cover of the microscope apparatus.
Figure 4:
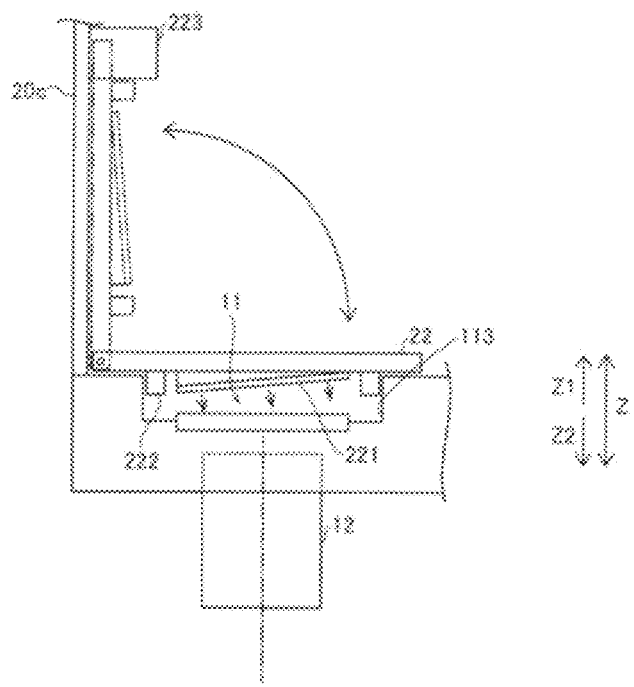
FIG. 4 is a front view showing a sample setting unit and a second cover of the microscope apparatus.

As shown in FIG. 3, the second cover 22 is formed in a plate shape. As shown in FIG. 4, the second cover 22 also is provided with a second light source 221 on the side of the second cover 22 that faces the sample setting unit 11. In this way it is possible to easily irradiate light from the second light source 221 to the sample setting unit 11 with the second cover 22 closed. Since a light guide member such as an optical fiber is rendered unnecessary by arranging the second light source 221 directly on the side of the second cover 22 that faces the sample setting unit 11, the illumination configuration can be simplified.

The second light source 221 includes a light emitter having a planar shape, a linear shape, or a punctate shape. In this way a thin light emitting body having a planar shape, a linear shape, or a punctate shape can be disposed on the second cover 22, and the second light source 221 can be disposed on the second cover 22 compactly.

The second cover 22 includes a protrusion 222 that surrounds the second light source 221 in a frame shape and is formed to protrude toward the sample setting unit 11. As shown in FIG. 4, the sample setting unit 11 includes a concavity 113 into which the protrusion 222 is accommodated when the second cover 22 is in a closed state. Accordingly, the protrusion 222 of the second cover 22 enters the concavity 113 of the sample setting unit 11, thereby suppressing a gap where light directly enters between the second cover 22 and the sample setting unit 11, and light is more effectively suppressed from entering the sample setting unit 11.

The second light source 221 is arranged so that the optical axis is shifted from the optical axis of the first light source 13. In this way the optical axis of the first light source 13 can be directed in a direction suitable for imaging light from below by the first light source 13, and the second light source 221 can be directed in the direction suitable for imaging light from above. In this way both the imaging by the light from above and the imaging by the light from below can be captured clearly.

For example, the second light source 221 is arranged such that the optical axis is inclined with respect to the optical axis of the first light source 13. In this way light can be irradiated from the direction suitable for both light sources, respectively, since the optical axis direction of the first light source 13 and the optical axis direction of the second light source 221 can be shifted mutually.

The second light source 221 irradiates the sample with light from a direction oblique to the optical axis of the objective lens 12 provided in the sample setting unit 11. That is, the second light source 221 is provided on the cover 22 so as to be inclined. In this way the sample can be imaged with enhanced contrast compared with when light is irradiated in parallel with the optical axis of the objective lens 12. Note that the second light source 221 may be arranged so as to irradiate light parallel to the optical axis of the objective lens 12.

The second light source 221 may include at least one of a halogen lamp, a tungsten lamp, a mercury lamp, a xenon lamp, and a light emitting element. When a halogen lamp, a tungsten lamp, a mercury lamp, or a xenon lamp is used as the second light source 221, the light may be guided to the sample setting unit 11 by an optical fiber, a mirror, or the like.

The second light source 221 is formed so as not to irradiate light from a portion through which the optical axis of the first light source 13 passes. In this way the optical axis of the light of the second light source 221 can be easily shifted relative to the optical axis of the light of the first light source 13. That is, the optical axis of the second light source 221 may be parallel to the optical axis of the first light source 13 as long as it is deviated from the optical axis of the first light source 13.

Figure 5:
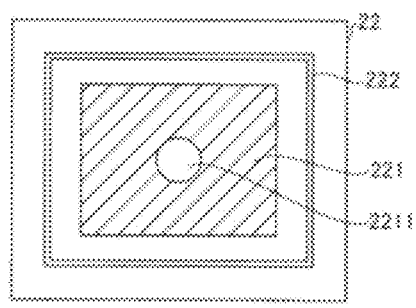
FIG. 5 is a view showing a first modification of the second cover of the microscope apparatus.

For example, as shown in FIG. 5, the second light source 221 may be provided with a light-opaque light blocking member 2211 substantially at the center of the light emitter. In this way it is possible to suppress the light irradiated in parallel with the optical axis of the objective lens 12 from reaching the sample setting unit 11. The light blocking member 2211 is, for example, a light shielding seal. The light blocking member 2211 is formed of a resin material or a metal material.

Figure 6:
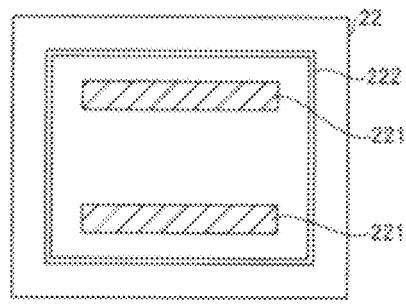
FIG. 6 is a view showing a second modification of the second cover of the microscope apparatus.
Figure 7:
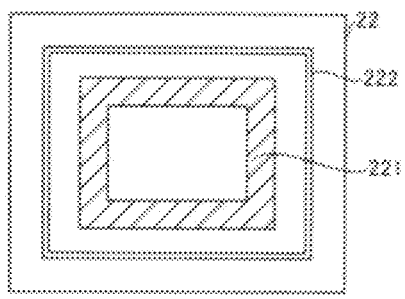
FIG. 7 is a view showing a third modification of the second cover of the microscope apparatus.
Figure 8:
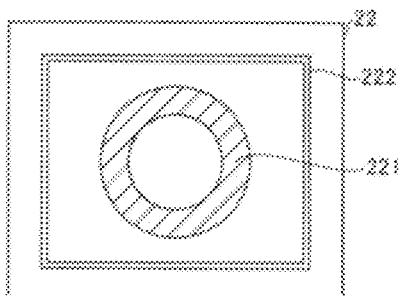
FIG. 8 is a view showing a fourth modification of the second cover of the microscope apparatus.

The second light source 221 may be provided in linear form on both sides of the center of the second cover 22, as shown in FIG. 6. As shown in FIG. 7, the second light source 221 also may be provided in a rectangular circumferential shape so as to surround the center of the second cover 22. The second light source 221 may be provided in circular periphery shape so that the center of the second cover 22 may be circumscribed, as shown in FIG. 8. Note that the shape and arrangement of the second light source 221 need not be bilaterally symmetrical or point symmetrical.

Structural Example of Optical System

Next, a structural example of the optical system of the microscope apparatus 100 will be described with reference to FIGS. 9 and 10.

Figure 9:
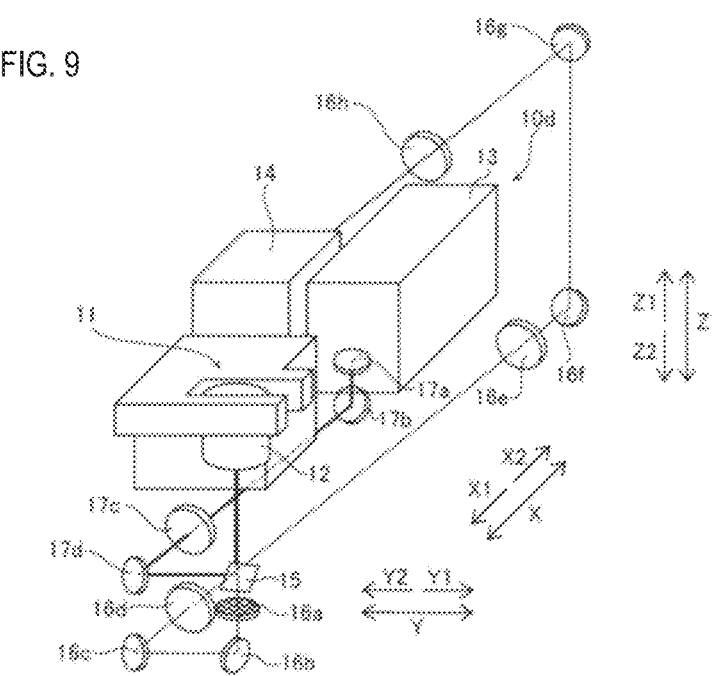
FIG. 9 is a schematic perspective view illustrating an example of the internal configuration of the microscope apparatus.

As shown in FIG. 9, the microscope apparatus 100 includes an objective lens 12, a first light source 13, an imaging element 14, a first optical element 15, a filter 16a, second optical elements 16b, 16c, 16f, and 16g, lenses 16d, 16e, 16h, reflectors 17a, 17b, and 17d, and a lens 17c. Objective lens 12, first light source 13, imaging element 14, first optical element 15, filter 16a, second optical elements 16b, 16c, 16f and 16g, lenses 16d, 16e, and 16h, reflectors 17a, 17b and 17d, and the lens 17c are disposed inside the housing unit 10.

The first optical element 15 is configured to reflect the light emitted from the first light source 13 in the optical axis direction of the objective lens 12, and transmit the light from the sample. The first optical element 15 includes, for example, a dichroic mirror. That is, the first optical element 1 is configured to reflect the light having the wavelength irradiated from the first light source 13, and transmit the wavelength of the light generated from the sample.

The filter 16a is configured to transmit light of a predetermined wavelength and block light of other wavelengths, or to block light of a predetermined wavelength and transmit light of other wavelengths. In other words, light having a desired wavelength is transmitted by the filter 16a and reaches the imaging element 14.

The second optical elements 16b, 16c, 16f, and 16g are configured to reflect light from the sample toward the imaging element 14. The second optical elements 16b, 16c, 16f, and 16g include a reflector. The second optical elements 16b, 16c, 16f, and 16g include, for example, mirrors.

The reflectors 17a, 17b, and 17d are configured to reflect the light from the first light source 13 toward the objective lens 12. The reflectors 17a, 17b, and 17d include, for example, a mirror.

The light emitted from the first light source 13 is reflected by the reflector 17a and enters the reflector 17b. The light that has entered the reflector 17b is reflected and enters the reflector 17d through the lens 17c. The light that has entered the reflector 17d is reflected and enters the first optical element 15. The light incident on the first optical element 15 is reflected and reaches the sample setting unit 11 via the objective lens 12 and irradiates the sample.

The light emitted from the sample based on the light of the first light source 13 enters the first optical element 15 through the objective lens 12. The light incident on the first optical element 15 is transmitted and enters the second optical element 16b via the filter 16a. The light incident on the second optical element 16b is reflected and incident on the second optical element 16c. The light incident on the second optical element 16c is reflected and enters the second optical element 16f via the lenses 16d and 16e. The light incident on the second optical element 16f is reflected and incident on the second optical element 16g. The light incident on the second optical element 16g is reflected and reaches the imaging element 14 via the lens 16h. The imaging element 14 captures an enlarged image of the sample based on the received light.

The first light source 13 is arranged at a position where the direction is changed at least once so that the light from the first light source 13 travels in a substantially vertical direction (Z direction) and enters the objective lens 12. That is, the first light source 13 is arranged at a position offset relative to the optical axis of the objective lens 12. In this way, when the objective lens 12 is arranged in a substantially vertical direction, it is not necessary to provide the first light source 13 on an extension line of the objective lens 12 in the optical axis direction, and thus an increase of size of the microscope apparatus 100 in the vertical direction is avoided.

The imaging element 14 is disposed at a position where the light from the sample is altered from a direction substantially parallel to the optical axis of the objective lens 12 so as to enter the imaging element 14. That is, the imaging element 14 is disposed at a position offset relative to the optical axis of the objective lens 12. In this way, since it is unnecessary to provide the imaging element 14 on an extension line in the optical axis direction of light from the sample, it is possible to suppress an increase of the size of the microscope apparatus 100 in the vertical direction. Note that the direction of the light from the sample need not be changed from the direction substantially parallel to the optical axis of the objective lens 12 until the light enters the imaging element 14.

Figure 10:
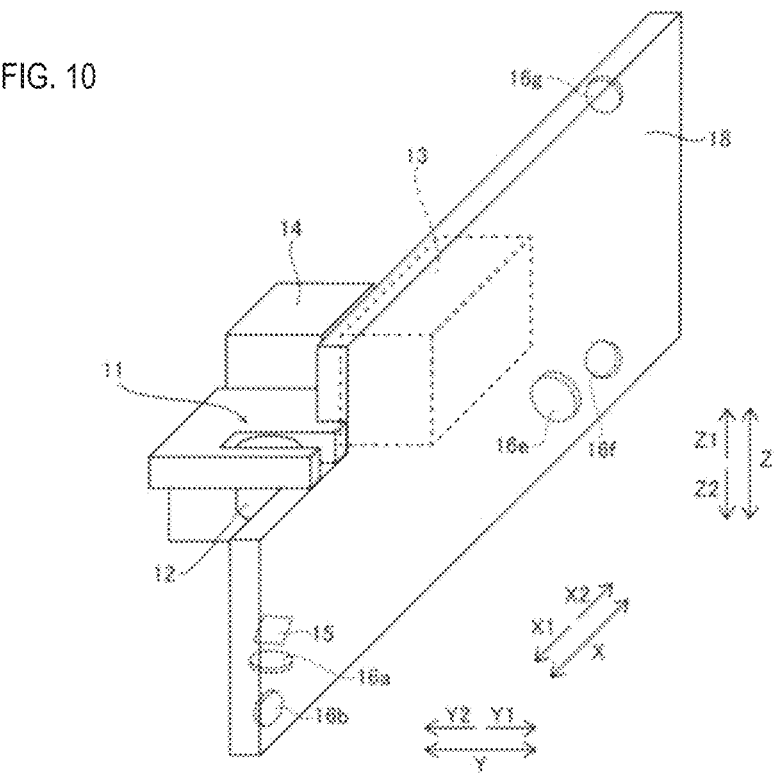
FIG. 10 is a schematic perspective view illustrating an example of a substrate disposed inside the microscope apparatus.
Figure 11:
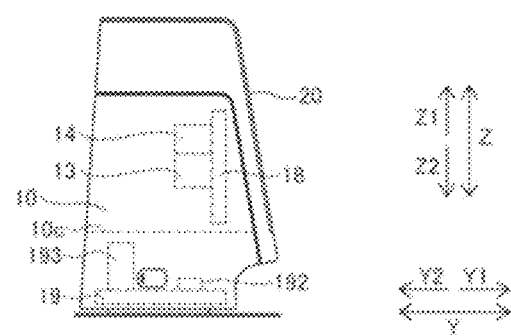
FIG. 11 is a side view showing an example of a microscope apparatus.

As shown in FIG. 10, the microscope apparatus 100 includes a substrate 18 disposed inside the housing unit 10, and on which the objective lens 12, first light source 13, and imaging element 14 are arranged so that the optical axis is substantially perpendicular to the sample setting unit 11. The substrate 18 is positioned so as to be substantially perpendicular relative to the installation surface of the housing unit 10 (refer FIG. 11). The substrate 18 is disposed so as to be substantially parallel to the optical axis of the objective lens 12. Specifically, the substrate 18 is disposed so as to extend along the XZ plane. In this way, since the objective lens 12, the first light source 13, and the imaging element 14 can be arranged on the common substrate 18, deviation of the positional relationship of the parts of the optical system can be suppressed.

The housing unit 10 has an internal space that extends in one direction. The objective lens 12 is arranged so that the optical axis is substantially perpendicular to the longitudinal direction (X direction) of the housing unit 10. The first light source 13 and the imaging element 14 are arranged on the same side (X2 direction side) relative to the objective lens 12 in the longitudinal direction (X direction) of the housing unit 10. In this way an increase of the size of the microscope apparatus 100 in the vertical direction can be suppressed.

The first optical element 15 and the second optical elements 16b, 16c, 16f, and 16g are disposed on the substrate 18. In this way, it is possible to suppress displacement of the relative positional relationship between the element 15 and the second optical elements 16b, 16c, 16f, and 16g since the first light source 13, the first optical element 15, and the second optical elements 16b, 16c, 16f, and 16g can be arranged on the common substrate 18.

The sample setting unit 11 is attached to the substrate 18 by both ends. That is, the sample setting unit 11 is supported by two pillars extending from the substrate 18 in the horizontal direction. In this way shifting of an imaging position at the time of imaging is suppressed since the sample setting part 11 can be supported stably.

Example of Connection Structure of Housing and First Cover

Next, an example of a connection structure between the housing unit 10 and the first cover 20 of the microscope apparatus 100 will be described with reference to FIGS. 12 to 15.

Figure 12:
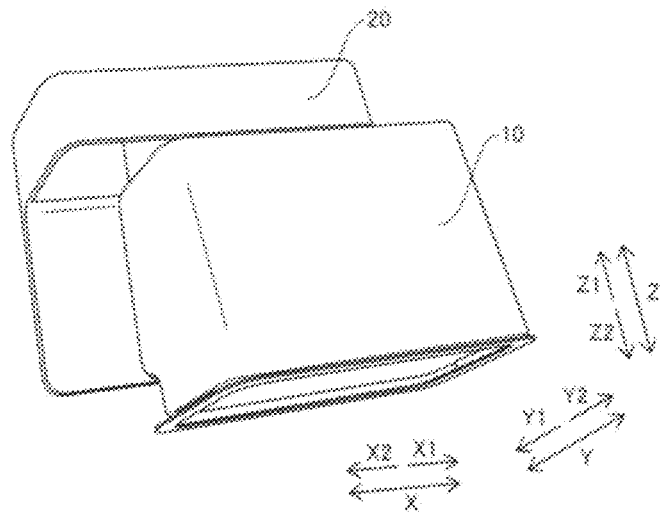
FIG. 12 is a perspective view of an example of a microscope apparatus viewed from the back side.
Figure 13:
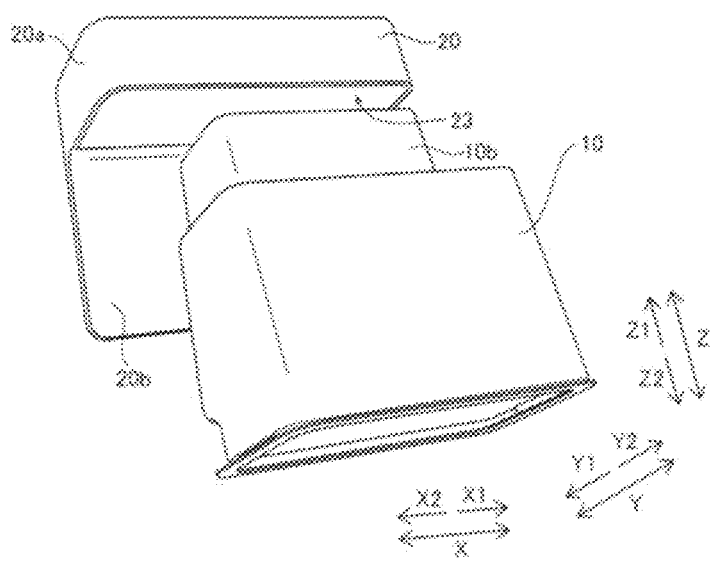
FIG. 13 is a perspective view illustrating a state in which the housing unit of the microscope apparatus and the first cover are separated from each other.

As shown in FIGS. 12 and 13, the housing unit 10 includes an engaging part 10b that protrudes upward (Z1 direction). The first cover 20 includes a concavity 23 that engages with the engaging part 10b of the housing unit 10. The concavity 23 is formed so as to be recessed in the vertical direction. The concavity 23 is formed to extend in the X direction. As shown in FIG. 12, the concavity 23 of the first cover 20 engages with the engaging part 10b of the housing unit 10. In this way the first cover 20 is connected to the housing unit 10 so that a movement in the X direction is possible.

Figure 14:
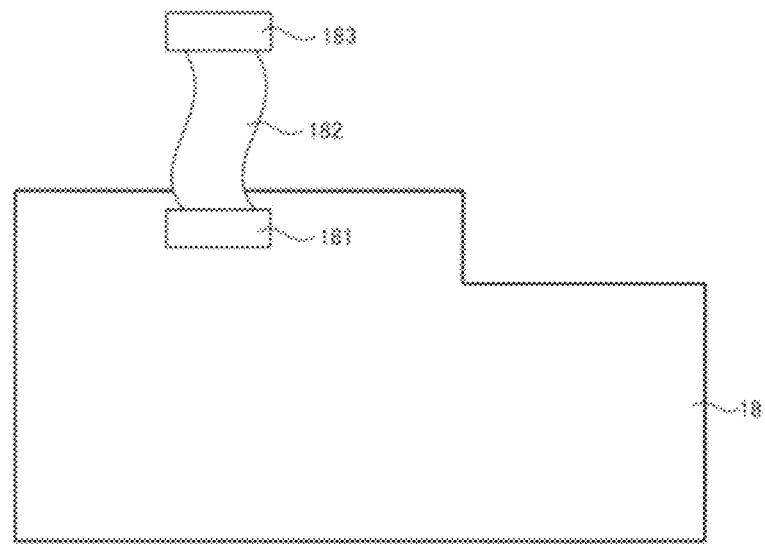
FIG. 14 is a diagram illustrating the connection of the substrate of the microscope apparatus.

As shown in FIG. 14, the substrate 18 disposed inside the housing unit 10 includes a connection terminal 181, a flex cable 182, and a connection terminal 183. The connection terminal 181 can be connected to the substrate 18. The flex cable 182 connects the connection terminals 181 and 183 to each other. The connection terminal 183 can be connected to a substrate provided on the first cover 20.

Figure 15:
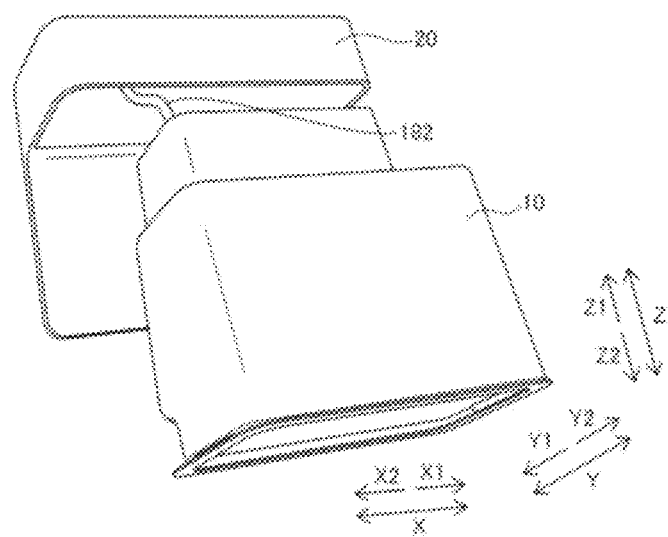
FIG. 15 is a view illustrating the connection between the housing unit of the microscope apparatus and the first cover.

As shown in FIG. 15, the display unit 21 is electrically connected to the housing unit 10 so as to be movable with respect to the housing unit 10. In this way electrical power can be supplied to the display unit 21 which moves relatively with the first cover 20 with regard too the housing unit 10, and electrical signals can be sent and received to/from the display unit 21.

Structural Example of Controller and Fan

Next, a structural example of the controller 192 of the microscope apparatus 100 will be described with reference to FIGS. 16 to 18.

Figure 16:
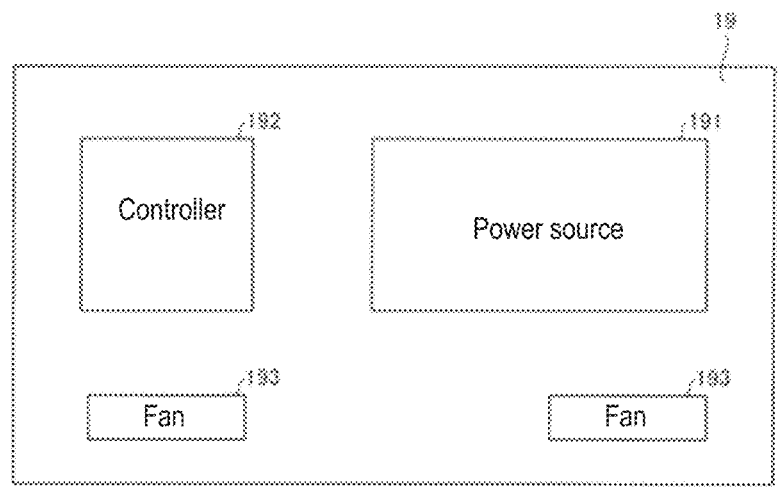
FIG. 16 is a block diagram showing an example of a control structure of the microscope apparatus.

As shown in FIG. 16, the microscope apparatus 100 includes a substrate 19. The substrate 19 is provided with a power source 191, a controller 192, and a plurality of fans 193. The substrate 19 is disposed below the interior of the housing unit 10 (see FIG. 11). The substrate 19 is arranged so that it may become horizontal. The power source 191 is supplied with external power. The power source 191 supplies the supplied power to each part of the microscope apparatus 100. For example, the power source 191 supplies power to the first light source 13, the second light source 221, the imaging element 14, the display unit 21, the first drive unit 10a, the second drive unit 223, the controller 192, the fan 193, and the like.

The controller 192 controls each part of the microscope apparatus 100. For example, the controller 192 controls light irradiation by the first light source 13. The controller 192 controls the drive of the first drive unit 10a. The controller 192 controls light irradiation by the second light source 221. The controller 192 controls the drive of the second drive unit 223. The controller 192 controls each part of the microscope apparatus 100 based on control by the control unit 200. The controller 192 is disposed inside the housing unit 10 in a region (see FIG. 11) that is partitioned from a region where the objective lens 12, the first light source 13, and the imaging element 14 are disposed. Specifically, it is partitioned by a partition member 10c. A substrate 18 is disposed above the partition member 10c. A substrate 19 is disposed below the partition member 10c. In this way the controller 192 can be disposed separately from the objective lens 12, the first light source 13, and the imaging element 14, so that heat generated by the controller 192 is not transmitted to the objective lens 12, the first light source 13, and the imaging element 14. The light shielding property of the objective lens 12, the first light source 13, and the imaging element 14 can be enhanced by a member that partitions the region in which the controller 192 is disposed.

Figure 17:
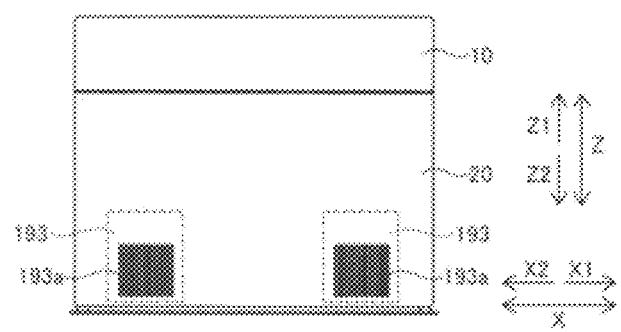
FIG. 17 is a rear view showing an example of a microscope apparatus.

As shown in FIGS. 16 and 17, the fan 193 is configured to cool the inside of the housing unit 10. Specifically, the fan 193 is configured to be driven to take in air from the outside into the housing unit 10, circulate the intake air, and discharge the circulated air from the exhaust port 193a. A pair of fans 193 are provided along the X direction. The fan 193 is provided on the lower side (Z2 direction side) of the rear surface side (Y2 direction side) of the housing unit 10. The operation of the fan 193 is stopped during the imaging of the sample by the imaging element 14. In this way it is possible to prevent vibration caused by the fan 193 from being transmitted to the imaging element 14, the sample setting unit 11 and the like during imaging, so that the sample can be imaged with high accuracy. Note that the fan 193 does not have to stop operation during imaging of the sample by the imaging device 14. In this way the inside of the housing unit 10 can be efficiently cooled even during imaging.

Figure 18:
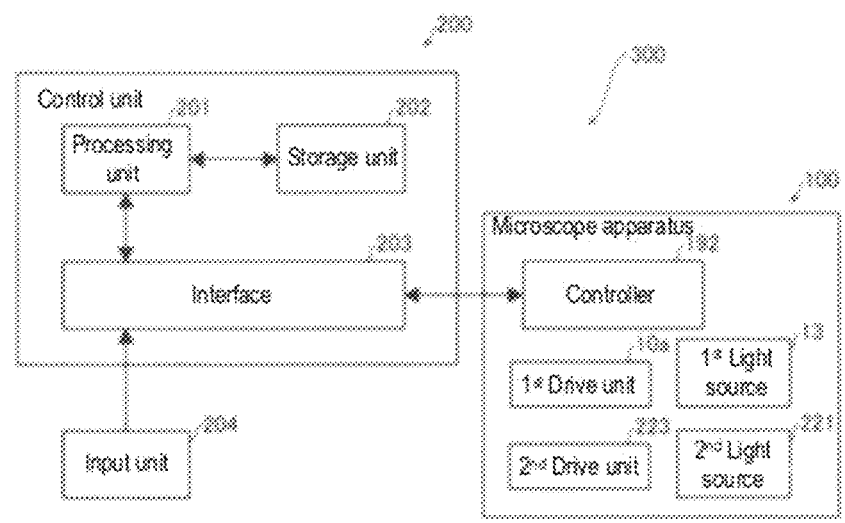
FIG. 18 is a block diagram illustrating an example of a control structure of a microscope system.

As shown in FIG. 18, the controller 192 is connected to the control unit 200. The control unit 200 includes a processing unit 201, a storage unit 202, and an interface 203. The control unit 200 is connected to the input unit 204. The controller 192 is connected to the processing unit 201 via the interface 203. The processing unit 201 includes, for example, a CPU and controls the operation of the microscope apparatus 100. The storage unit 202 includes, for example, an HDD (hard disk drive), an SSD (solid state drive), and the like, and stores information and programs executed by the control unit 200. The input unit 204 receives user operations. The input unit 204 includes, for example, a mouse and a keyboard. The input unit 204 is connected to the processing unit 201 via the interface 203.

Microscope Apparatus Structure of a First Modification)

Next, the configuration of the microscope apparatus 400 according to a first modification will be described with reference to FIGS. 19A and 19B.

As shown in FIGS. 19A and 19B, the microscope apparatus 400 includes a housing unit 410 and a first cover 420. The housing unit 410 is provided with a sample setting unit 411. A display unit 421 is integrally provided on the first cover 420. The sample setting unit 411 is provided with a second cover 22 that covers the sample setting unit 411. As shown in FIG. 19B, the first cover 420 is disposed on the front surface side (Y1 direction side) of the housing unit 410. The first cover 420 has a flat plate shape extending along a plane (XZ plane) perpendicular to the installation surface of the housing unit 410.

The first cover 420 is configured to be movable between a first position (light shielding position) and a second position (open position) by sliding along the vertical direction (Z direction). The moving direction of the first cover 420 is substantially parallel to the plane direction in which the display unit 421 extends. That is, when the display unit 421 is arranged with a predetermined angle with respect to the vertical direction (Z direction), the moving direction of the first cover 420 is a direction inclined with a predetermined angle relative to the vertical direction (Z direction). As shown in FIG. 19B, when the first cover 420 is positioned at the second position, the front side (Y1 direction side) of the sample setting unit 411 is opened. In this case, the second cover 22 is also opened. The sample setting unit 411 is disposed on the X1 direction side of the housing unit 410. The sample setting unit 411 is disposed on the upper side (Z1 direction side) of the housing unit 410 in the vertical direction (Z direction).

Microscope Apparatus Structure of Second Modification

Next, with reference to FIGS. 20A and 20B, the structure of the microscope apparatus 500 of a second modification is described.

As shown in FIGS. 20A and 20B, the microscope apparatus 500 includes a housing unit 510 and a first cover 520. The housing unit 510 is provided with a sample setting unit 511. The first cover 520 is integrally provided with a display unit 521. The sample setting unit 511 is provided with a second cover 22 that covers the sample setting unit 511. As shown in FIG. 20B, the first cover 520 is disposed on the front surface side (Y1 direction side) of the housing unit 510. The first cover 520 has a flat plate shape extending along a plane (XZ plane) perpendicular to the installation surface of the housing unit 510.

The first cover 520 is configured to be movable between a first position (light-shielding position) and a second position (open position) by sliding along the horizontal direction (X direction). As shown in FIG. 20B, when the first cover 520 is located at the second position, the front side (Y1 direction side) of the sample setting unit 511 is opened. In this case, the second cover 22 is also opened. The sample setting unit 511 is movable in the forward direction (Y1 direction). Accordingly, when the sample setting unit 511 is moved forward, the upper side (Z1 direction) of the sample setting unit 511 is also opened. The sample setting unit 511 is disposed on the X1 direction side of the housing unit 510. The sample setting unit 511 is disposed on the upper side (Z1 direction side) of the housing unit 510 in the vertical direction (Z direction).

Microscope Apparatus Structure of Third Modification

Figure 22:
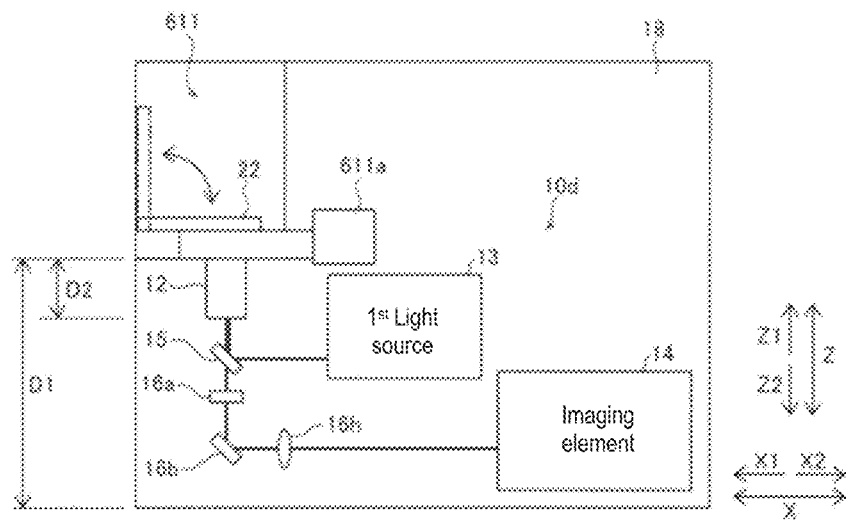
FIG. 22 is a block diagram showing a control structure of a third modification of the microscope apparatus.

Next, with reference to FIGS. 21A and 21B, and FIG. 22, the structure of the microscope apparatus 600 of a third modification is described.

As shown in FIG. 21B, the microscope apparatus 600 includes a housing unit 610 and a first cover 620. The housing unit 610 is provided with a sample setting unit 611. A display unit 621 is integrally provided on the first cover 620. The sample setting unit 611 is provided with a second cover 22 that covers the sample setting unit 611. As shown in FIGS. 21A and 21B, the first cover 620 is disposed on the front surface side (Y1 direction side) of the housing unit 610. The first cover 620 has a flat plate shape that extends along a plane (XZ plane) perpendicular to the installation surface of the housing unit 610.

The first cover 620 is configured to be movable between a first position (light shielding position) and a second position (open position) by sliding along the horizontal direction (X direction). As shown in FIG. 21B, when the first cover 620 is located at the second position, the front side (Y1 direction side) of the sample setting unit 611 is opened. In this case, the second cover 22 is also opened. The sample setting unit 611 is disposed on the X1 direction side of the housing unit 610. The sample setting unit 611 is disposed near the center of the housing unit 610 in the vertical direction (Z direction).

As shown in FIG. 22, the objective lens 12, the first light source 13, the imaging element 14, the actuator 611a, the first optical element 15, the filter 16a, the second optical element 16b, and a lens 16h are provided on the substrate 18 of the microscope apparatus 600. The objective lens 12 is disposed below (Z2 direction) the sample setting unit 611. The sample setting unit 611 is disposed such that the distance D1 between the installation surface of the housing unit 10 and the sample setting unit 611 is longer than the length D2 of the objective lens 12 in the optical axis direction. In this way since the optical axis of the objective lens 12 can be arranged in the vertical direction (Z direction), the objective lens 12 can be easily brought near the sample in the optical axis direction when the sample setting unit 611 is set in the horizontal direction.

Structural Example of Light Source

Next, a structural example of the first light source 13 will be described with reference to FIG. 23.

Figure 23:
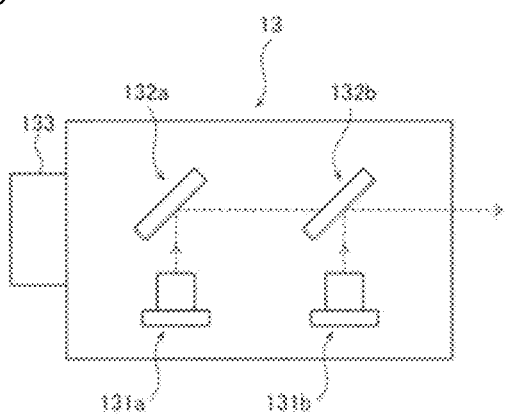
FIG. 23 is a block diagram illustrating an example of a structure of a light source of a microscope apparatus.

As shown in FIG. 23, the first light source 13 includes a first light source 131a for fluorescence excitation, a second light source 131b for fluorescence excitation, a mirror 132a, a dichroic mirror 132b, and a fan 133. The first light source 131a and the second light source 131b output light having different wavelengths. The first light source 131a outputs light in a specific wavelength region. The second light source 131b outputs light in a specific wavelength region different from that of the first light source 131a. Each of the first light source 131a and the second light source 131b can output a laser beam. Note that the light output from the first light source 131a and the second light source 131b may be light in the visible light region, or may be light in the far infrared region, the near infrared region, the near ultraviolet region, or the far ultraviolet region or light in the invisible light region.

The light output from the first light source 131a is reflected by the mirror 132a, passes through the dichroic mirror 132b, and output from the first light source 13. The light output from the second light 131b is reflected by the dichroic mirror 132b and output from the first light source 13. In this way the light output from the first light source 131a and the light output from the second light source 131b are output from the first light source 13 such that the optical axes thereof are coincident with each other.

The first light source 131a irradiates the sample with light having a wavelength for activating a part of a plurality of dyes bonded to the sample. The second light source 131b irradiates the sample with light having a wavelength for deactivating the plurality of dyes that have been activated. The imaging element 14 is configured so that the light emitted from the one part of the stain which became activated among several stains may be imaged. In this way an image can be captured based on light emission of a part of the stain in an active state. The imaging element 14 is configured to image the sample a plurality of times. The display unit 21 is configured to display an image obtained by combining a plurality of images captured by the imaging element 14.

Some of the stains bound to the sample emit light. The stain is bound to each cell molecule. The fluorescent image captured by sequential excitation of stains multiple times, that is, the fluorescence position of the stain, are acquired more accurately. Then, a plurality of images are superimposed. In this case, the fluorescence position of the stain is obtained with high accuracy in units of one molecule. By superimposing the fluorescent images acquired with the positional accuracy for each molecule, it is possible to acquire a super-resolution image exceeding the resolution limit.

The fan 133 is disposed inside the housing unit 10 and is provided to cool the first light source 13. Specifically, the fan 133 is configured to generate an air flow around the first light source 13 when driven to remove heat generated from the first light source 13. The operation of the fan 133 is stopped during the imaging of the sample by the imaging device 14. In this way it is possible to prevent vibration generated by the fan 133 from being transmitted to the imaging element 14, the sample setting unit 11 and the like during imaging, and thus it is possible to image the sample with high accuracy. Note that the fan 133 does not have to stop operating during imaging of the sample by the imaging element 14. In this way it also is possible to cool the first light source 13 efficiently during imaging.

Display Screen Examples of Display Unit

Next, an example of display screens displayed on the display unit 21 will be described with reference to FIG. 24.

Figure 24:
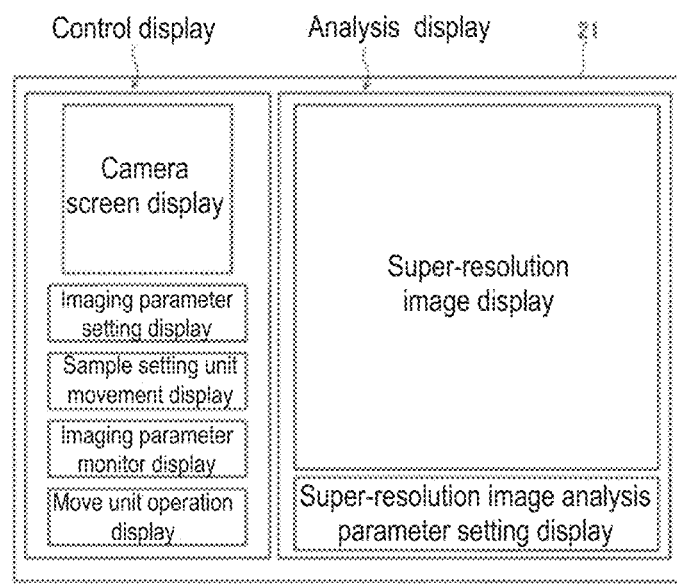
FIG. 24 is a diagram showing an example of a display screen of the display unit of the microscope apparatus.

In the example of the display screen shown in FIG. 24, when the sample is being imaged in the microscope apparatus 100, the display for control and the display for analysis are displayed on the display unit 21. The control display includes a camera screen display, an imaging parameter setting display, a sample setting unit moving operation display, an imaging parameter monitor display, and a first cover opening/closing operation display. The analysis display includes a super-resolution image display and a super-resolution image analysis parameter setting display.

In the camera screen display, a real-time camera screen imaged by the imaging element 14 is displayed. In the imaging parameter setting display, imaging parameters of the imaging process in the microscope apparatus 100 are displayed. In the imaging parameter setting display, for example, a display for adjusting the power of the laser beam output from the first light source 13 is displayed. For example, an operation screen for moving the position of the sample setting unit 11 is displayed on the sample setting unit moving operation display. Monitor information is displayed on the imaging parameter monitor display. In the imaging parameter monitor display, for example, the position of the sample setting unit 11, the power of the laser light of the first light source 13, the temperature of the imaging element 14, the imaging time, the time until the end of imaging, and the like are displayed. In the first cover opening/closing operation display, for example, an operation screen for moving the first cover 20 to the first position (light shielding position) and the second position (open position) is displayed.

A super-resolution image is displayed in the super-resolution image display. Note that the data of the super-resolution image has a size of about several thousand pixels square to tens of thousands of pixels square. Here, it is preferable that the area of the display unit 21 is larger since the display area of super-resolution image display can be increased as the size of the display unit 21 is larger. In the super-resolution image analysis parameter setting display, analysis parameters for super-resolution imaging are displayed. In the super-resolution image analysis parameter setting display, for example, the irradiation order of the laser light output from the first light source 13 and the number of images to be captured are displayed.

Display Unit Operation Screen Example

Figure 25:
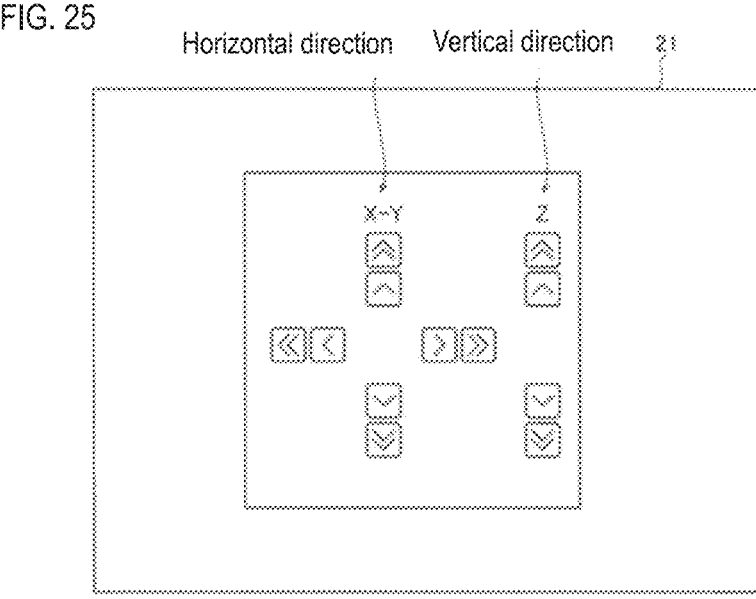
FIG. 25 is a diagram showing an example of an operation screen on the display unit of the microscope apparatus.

Next, an example of an operation screen displayed on the display unit 21 will be described with reference to FIG. 25. In the example of FIG. 25, an example of an operation screen for moving the stage 11*a* of the sample setting unit 11 will be described. In the example of FIG. 25, an operation button for moving the stage 11*a* in the X direction and the Y direction (horizontal direction) and an operation button for moving the stage 11*a* in the Z direction (vertical direction) are displayed. The user can move the stage 11*a* by operating each operation button. The stage 11*a* can be moved coarsely by operating the outer operation buttons. Moreover, the stage 11*a* can be moved finely by operating each operation button on the inner side. Note that the stage 11*a* can also be moved by operating an external keyboard or mouse.

Image Capture Process Operation

The image capture process operation of the microscope system 300 will be described with reference to FIG. 26.

Figure 26:
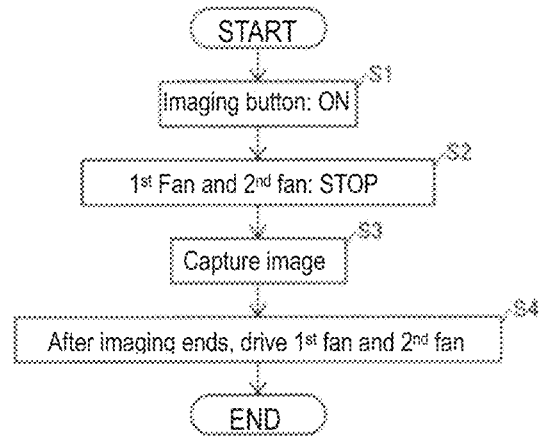
FIG. 26 is a flowchart illustrating an example of an image capturing process.

First, when the imaging button is turned ON by user operation in step S1 of FIG. 26, then, in step S2, the control unit 200 performs controls to stop the driving of the fan 193 and the fan 133 via the controller 192. In step S3, the control unit 200 controls imaging of the sample by the imaging element 14. Imaging of the sample is performed multiple times. !!br0ken!! For example, in step S3, the sample is imaged about several thousand to tens of thousands of times.

In step S4, after the imaging is finished, the control unit 200 performs control for driving the fan 193 and the fan 133 via the controller 192. Thereafter, the image capturing process operation is terminated.

Super-Resolution Image Creation Process Operation

The super-resolution image creation process operation of the microscope system 300 will be described with reference to FIG. 27.

Figure 27:
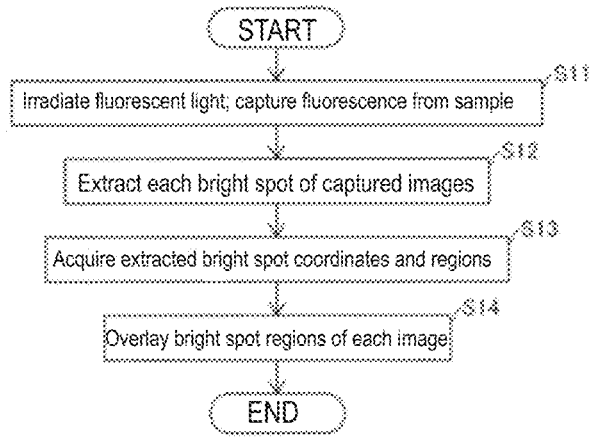
FIG. 27 is a flowchart showing an example of a super-resolution image creation process.
Figure 28:
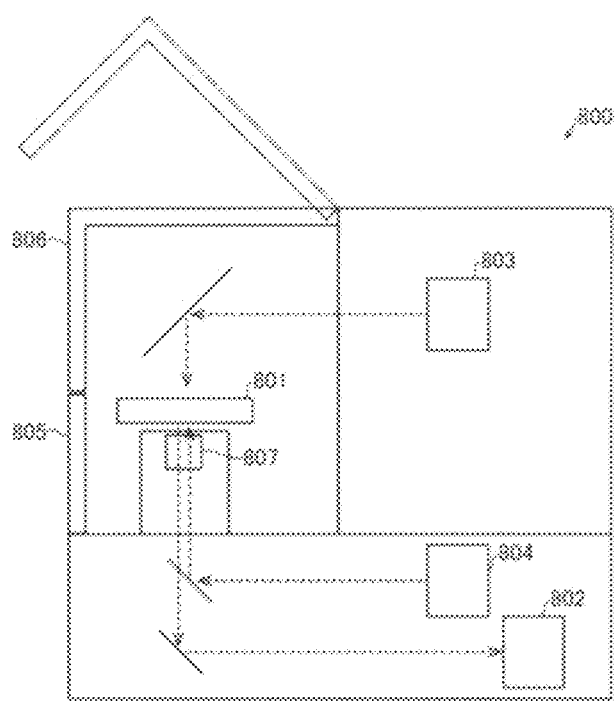
FIG. 28 is a block diagram showing a conventional microscope apparatus.

First, in step S11 of FIG. 27, the control unit 200 images the fluorescence of the sample while irradiating light for fluorescence excitation from the first light source 13. In step S12, the control unit 200 extracts a fluorescent spot of each captured image. Specifically, fluorescent spots are extracted from the captured image by Gaussian fitting. In step S13, the control unit 200 acquires the coordinates of the extracted spot. That is, the position of the pixel of the bright spot on the image is obtained. Specifically, the coordinates of each spot are acquired on a two-dimensional plane. Then, a bright spot region on the image is acquired. Specifically, regarding each fluorescent region on the captured image, each bright spot region of a breadth corresponding to a range is allocated to each bright spot when matching with a reference waveform within a predetermined range is obtained by Gaussian fitting. A bright spot region having the lowest level is assigned to the bright spot in the fluorescent region that matches the reference waveform at one point.

In step S14, the control unit 200 overlaps the bright spot areas of the images. Then, the control unit 200 creates a super-resolution image by superimposing the acquired bright spot region of each bright spot on all the images. Thereafter, the super-resolution image creation process is terminated.

Note that the embodiments disclosed herein should be considered as illustrative in all respects and not restrictive. The scope of the present invention is shown not by the above description of the embodiments but by the scope of the patent claims, and also includes all modifications within the meaning and scope of claims.

What is claimed is:

1. A microscope apparatus comprising:
   a sample setting unit in which a sample is set;
   an imaging unit configured to image the sample set in the sample setting unit;
   a housing unit on which the sample setting unit is arranged, and which is configured to internally accommodate the imaging unit;
   a first light source configured to irradiate light for fluorescence excitation on the sample in the sample setting unit;
   a first cover configured to be movable to a first position that covers the sample setting unit and a second position that opens the sample setting unit; and
   a second cover configured to be movable within the first cover so as to be in a closed state that covers the sample setting unit and an open state that opens the sample setting unit; and
   a second light source arranged in a space covered with the second cover and configured to irradiate light on the sample in the sample setting unit,
   wherein, when the first cover is in the first position and the second cover is in the closed state, the sample setting unit is covered twice by the first cover and the second cover so that external light passing through a gap between the first cover and the housing does not reach the sample setting unit.

2. The microscope apparatus according to claim 1, wherein
   the second light source is provided on the second cover.

3. The microscope apparatus according to claim 2, wherein
   the second light source has a planar shape, a linear shape, or a punctate shape.

4. The microscope apparatus according to claim 2, wherein
   the second cover includes a protruding portion that circumscribes the second light source in a frame shape and is formed so as to protrude toward a side of the sample setting unit; and
   the sample setting unit includes a concave portion into which the protruding portion fits when the second cover is in the closed state.

5. The microscope apparatus according to claim 1, wherein
   the second cover is configured so as to be in the closed state covering the sample setting unit in conjunction with the first cover moved to the first position, and be in the open state to open the sample setting unit in conjunction with the first cover moved to the second position.

6. The microscope apparatus according to claim 5, wherein
   the second cover is configured to be in the closed state after the first cover is relatively moved to the first position with respect to the housing unit, and be in the open state before the first cover is relatively moved to the second position with respect to the housing unit.

7. The microscope apparatus according to claim 1, further comprising:
   a first drive unit configured to relatively move the first cover with respect to the housing unit;
   a second drive unit configured to move the second cover; and
   a controller configured to control the first drive unit and the second drive unit.

8. The microscope apparatus according to claim 7, wherein
   the controller is configured to control light irradiation of the first light source and light irradiation of the second light source.

9. The microscope apparatus according to claim 1, wherein
   the second light source includes at least one of a halogen lamp, a tungsten lamp, a mercury lamp, a xenon lamp, or a light emitting element.

10. The microscope apparatus according to claim 1, wherein
    the second light source is configured to irradiate light on the sample from a direction oblique to an optical axis of an objective lens provided in the sample setting unit.

11. The microscope apparatus according to claim 1, wherein
    the second light source is configured to emit bright field light.

12. The microscope apparatus according to claim 1, further comprising a controller configured to:
    control the imaging unit to capture a plurality of fluorescent images of the sample based on the light of the first light source; and
    acquire a super-resolution image exceeding a resolution of the imaging unit based on the plurality of fluorescent images.

13. The microscope apparatus according to claim 1, wherein the sample setting unit includes a stage on which the sample is set, wherein
    the microscope apparatus further comprises:
    a display unit configured to display an image of the sample based on the light of the second light source, and an operation screen for moving the stage of the sample setting unit; and
    a controller configured to control the stage to adjust a position of the sample based on user input through the operation screen.

* * * * *